United States Patent [19]
Schindler et al.

[11] Patent Number: 5,867,223
[45] Date of Patent: Feb. 2, 1999

[54] SYSTEM FOR ASSIGNING MULTICHANNEL AUDIO SIGNALS TO INDEPENDENT WIRELESS AUDIO OUTPUT DEVICES

[75] Inventors: Jeffrey Schindler, Sioux City, Iowa; Bradley A. Forrest, Burnsville, Minn.

[73] Assignee: Gateway 2000, Inc., North Sioux City, S. Dak.

[21] Appl. No.: 624,024

[22] Filed: Mar. 27, 1996

Related U.S. Application Data

[63] Continuation-in-part of Ser. No. 503,120, Jul. 17, 1995, Pat. No. 5,675,390.

[51] Int. Cl.$^6$ .................................................. H04N 7/00
[52] U.S. Cl. ................................ 348/552; 348/13; 348/6; 455/6.3
[58] Field of Search ..................... 340/825.22, 825.24, 340/825.25; 455/4.1, 6.3; 395/154; 301/77, 80, 81; 348/462, 723, 552, 705, 906, 731, 706, 8, 7, 6, 12, 13; H04N 5/208, 7/00

[56] References Cited

U.S. PATENT DOCUMENTS

| | | | |
|---|---|---|---|
| 4,428,078 | 1/1984 | Kuo .................................................. | 455/3 |
| 4,689,683 | 8/1987 | Efron ................................................ | 348/705 |
| 4,829,500 | 5/1989 | Saunders ........................................... | 369/5 |
| 4,835,604 | 5/1989 | Kondo et al. .................................... | 348/8 |
| 4,845,751 | 7/1989 | Schwab ............................................ | 381/25 |
| 4,885,803 | 12/1989 | Hermann et al. ................................ | 348/8 |
| 5,182,552 | 1/1993 | Paynting ........................................... | 340/825.25 |
| 5,192,999 | 3/1993 | Graczyk et al. .................................. | 358/85 |
| 5,193,208 | 3/1993 | Yokota et al. .................................... | 455/4.1 |
| 5,193,210 | 3/1993 | Nicholas et al. ................................. | 455/38.1 |
| 5,283,819 | 2/1994 | Glick et al. ...................................... | 348/552 |
| 5,291,556 | 3/1994 | Gale .................................................. | 381/17 |
| 5,349,386 | 9/1994 | Borchardt et al. ............................... | 348/485 |
| 5,425,101 | 6/1995 | Woo et al. ........................................ | 380/23 |
| 5,442,452 | 8/1995 | Ryu ................................................... | 348/462 |
| 5,453,796 | 9/1995 | Duffield et al. .................................. | 348/565 |
| 5,506,628 | 4/1996 | Chun ................................................. | 348/565 |
| 5,541,662 | 7/1996 | Adams et al. .................................... | 348/552 |
| 5,548,346 | 8/1996 | Mimura et al. .................................. | 348/462 |
| 5,592,482 | 1/1997 | Abraham et al. ................................ | 348/8 |

FOREIGN PATENT DOCUMENTS

| | | | |
|---|---|---|---|
| 2 364 586 | 4/1978 | France . | |
| 01175492 | 7/1989 | Japan ........................... | H04Q 9/00 |
| 2202978 | 10/1988 | United Kingdom ............ | G06F 12/06 |
| 9500917 | 1/1995 | WIPO ............................. | G06F 15/62 |
| WO95/00917 | 1/1995 | WIPO ............................. | G06F 15/62 |
| WO95/01056 | 1/1995 | WIPO ............................. | H04N 7/16 |
| WO97/04382 | 2/1997 | WIPO ............................. | H04N 5/44 |

OTHER PUBLICATIONS

"Audio Switch for Educational Laboratories", *IBM Technical Disclosure Bulletin*, vol. 36, No. 09A, pp. 535–536, (Sep. 1993).

*Primary Examiner*—Sherrie Hsia
*Attorney, Agent, or Firm*—Schwegman, Lundberg, Woessner & Kluth, P.A.

[57] ABSTRACT

A home entertainment and information system is provided which assigns and transmits audio programming to audio output devices. Digital and analog signals from a variety of program sources are received by the home entertainment and information system. The system assigns and transmits to an audio output device a program that is distinct from programs assigned and transmitted to other audio output devices within the same system, and thus where two users are viewing different programs visually displayed on the same or different monitors, they hear the audio portion of the respective program they are viewing through individual audio output devices. An audio output device is also assignable to a remote control device such that when a program is selected using the remote control device, the audio portion of the program is transmitted to the assigned audio output device.

26 Claims, 25 Drawing Sheets

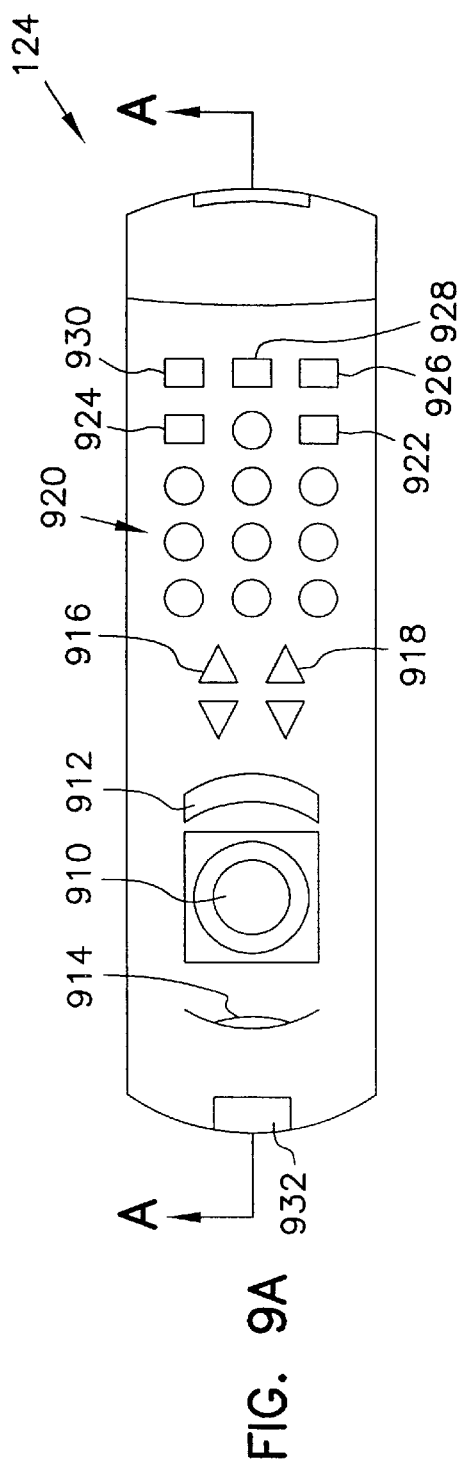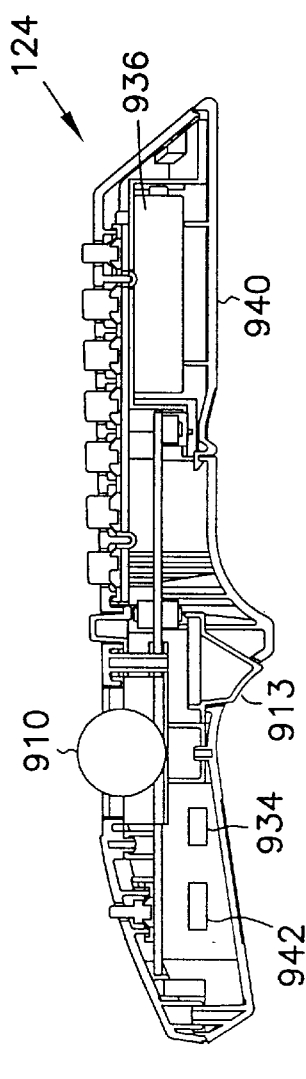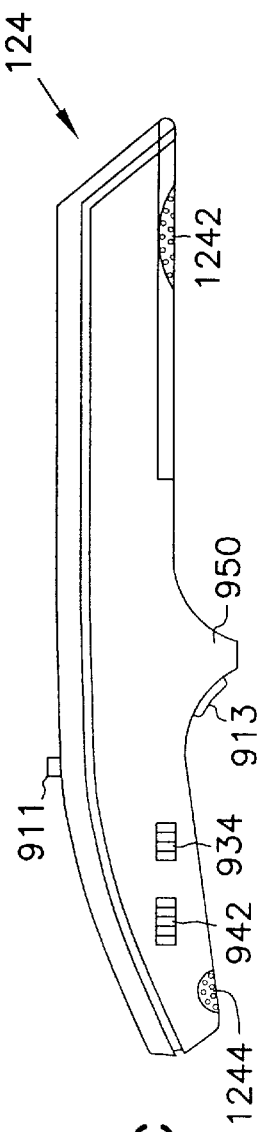

| AUDIO OUTPUT DEVICE | TRANSMITTER ADDRESS | |
|---|---|---|
| SET 1 ⎫ 1720<br>SET 2 ⎭<br>⋮ | SLOT 3 ⎫ 1710<br>SLOT 7 ⎭<br>⋮ | ← 1700 |

FIG. 17

| AUDIO OUTPUT DEVICE ID | REMOTE CONTROL ID | PROGRAM ID | |
|---|---|---|---|
| SET 1 ~1720<br>⋮ | RC 1 ~1810<br>⋮ | PROG A ~1820<br>⋮ | ← 1800 |

FIG. 18A

| AUDIO OUTPUT DEVICE ID | REMOTE CONTROL ID | PROGRAM ID | |
|---|---|---|---|
| SET 1 ⎫ 1720<br>SET 2 ⎭<br>⋮ | RC 1 ⎫ 1810<br>RC 1 ⎭<br>⋮ | PROG A ⎫ 1820<br>PROG B ⎭<br>⋮ | ← 1800 |

FIG. 18B

| AUDIO OUTPUT DEVICE ID | REMOTE CONTROL ID | PROGRAM ID | |
|---|---|---|---|
| SET 1 ⎫ 1720<br>SET 2 ⎭<br>⋮ | RC 1 ⎫ 1810<br>RC 1 ⎭<br>⋮ | PROG B ⎫ 1820<br>PROG B ⎭<br>⋮ | ← 1800 |

FIG. 18C

SYSTEM FOR ASSIGNING MULTICHANNEL AUDIO SIGNALS TO INDEPENDENT WIRELESS AUDIO OUTPUT DEVICES

This application is a Continuation-In-Part of U.S. Ser. No. 08/503,120, filed on Jul. 17, 1995, now issued as U.S. Pat. No. 5,675,390, entitled "HOME ENTERTAINMENT SYSTEM COMBINING COMPLEX PROCESSOR CAPABILITY WITH A HIGH QUALITY DISPLAY".

FIELD OF THE INVENTION

The present invention relates generally to methods and apparatus for controlling audio signals, and more specifically to a home information and entertainment system which associates audio portions of programs to independent audio output devices.

BACKGROUND OF THE INVENTION

When television systems were simple and programming sources were few, families accepted the limitation of only being able to view a single program at a time. Simple television systems advanced to become entertainment systems with integrated stereo sound and more sophisticated video reception and display capabilities. Picture in a picture (PIP) television made it possible for families to view multiple programs at the same time on a single monitor. Thus one member could watch a sporting event transmitted via cable television while the other members watched a videotaped movie. As computers are integrated into the entertainment system the multiprogramming possibilities are greatly increased. The oversized monitors of today can support simultaneous presentation of multiple video programs.

For each of the viewing options, however, the audio options are limited. Where the entertainment system is comprised of multiple programming sources, the audio output from all of the sources can be directed through a stereo amplifier. This provides centralized control, but it limits the viewers to hearing only one program at a time, regardless how many programs are being viewed. Where multiple programs are viewed on the same monitor, the audio portion of only one program is presented at a time, and those viewing the other programs must do without sound. If multiple monitors are used, each may have its own speaker system and project the audio for the program being viewed, but this creates a cacophony of sound which is unlistenable when different family members watch different programs in the same room. One solution for those families who wish to view multiple programs at the same time is to construct multiple entertainment systems. As the devices get more complex, however, they get more expensive, and the duplication of components places multiple systems out of the economic reach of most people. When the entertainment system presents programming which is available in multiplexed format (whether it be via picture in a picture television technology, multi-window computer presentations, or a combination of the two), duplication of components does not address the function of multi-window display. Video display technology has kept pace with the need for simultaneously presenting different video programs to different viewers. There has not been a comparable advance in audio presentation technology.

The restriction to single channel audio output is unworkable when the programming sources are primarily entertainment-oriented. A family cannot use all of the functions of a sophisticated multi-channel video presentation when they are limited to hearing the audio output of only one program at a time. If only one of the programs being viewed has sound, there is little value in viewing the programs for which sound is not projected. The restriction to a single audio output becomes more significant when the home entertainment system is expanded to provide information as well as entertainment by incorporating a computer. The computer is employed both as a programming source as well as an intelligent controller for the entertainment and information system. In a home entertainment and information system, signals generated by the various programming sources can be multiplexed by the computer. The signals for a television program and a computer-based multimedia application may be multiplexed and transmitted to a single monitor and simultaneously displayed, each program in its own window on the monitor.

Software running on the computer has a sound aspect as well as a visual aspect. It may be as simple as a warning beep, or as sophisticated as a multimedia presentation containing CD-quality sound. In either event, like television programming, without the sound aspect the usefulness of the program to the user is reduced. One partial solution to the problem of simultaneously transmitting audio signals from multiple sources (such as a CD player or AM/FM tuner) is a multiple zone audio system, described in U.S. Pat. No. 5,182,552 to Paynting. That system consists of a centralized group of audio programming sources, connected to an array of speakers and controlled by multiple remote control devices. Each remote control device controls which audio source's signals will be transmitted on the channel associated with the remote control device. This allows independent access of the different program signals in different zones. The problem of simultaneously transmitting independent audio programming to the same zone remains. There is a need to provide multiple simultaneous users of an entertainment system with the audio portion of the different programs being viewed whether they are in the same or different rooms.

SUMMARY OF THE INVENTION

According to the present invention, a home information and entertainment system controlled by a multipurpose computer system capable of running multiple programs contemporaneously provides independent audio streams to users based on the program they select regardless of their physical proximity. The information and entertainment system comprises a number of program sources including broadcast video signals, broadcast radio signals, network-based information signals via modem, and computer programs running on the computer system itself. The computer system receives or generates video and audio signals and transmits the signals to the appropriate monitors such as speaker systems, headsets, and display devices. Video signals comprise video data which includes but is not limited to graphics, text, still and motion video, broadcast or cable television—any image capable of being displayed on a video monitor.

In one embodiment, signals generated by a television program and a computer-based application are received by the computer system and converted into independent data streams. During output processing, the computer directs the independent data streams to the appropriate monitor in the following manner. Each program is associated with a particular user. An audio output device, such as a headset or set of speakers, is associated with each user. Each program's audio data stream is then directed by the computer to the audio output device assigned to the program's associated user. The computer is capable of managing several such program scenarios simultaneously. For example, a television program and a computer program are displayed at the same time on the same video monitor. Transmitting the audio portions through the same speaker system, however, would give less than satisfactory results because viewers are unable to distinguish the individual sound tracks. Instead, the audio output from the computer program is directed to a specific headset at the same time audio output from the television program is directed to a different headset, group of headsets, or set of speakers. As a result, even though they remain in the same room and are viewing their respective programs on the same video monitor, the users wearing headsets each hear only the audio program they want to hear.

In another embodiment, the audio portions of multiple programs are transmitted to the computer controlling the entertainment and information system. Each of the wireless headsets which are part of the entertainment and information system are assigned a unique transmitter address and headset identifier. In another embodiment wireless speakers are included in the entertainment system and are assigned a unique transmitter address and a headset identifier. The assigned transmitter address and identification id are maintained in an audio output device assignment table in the computer system's memory. The audio output device desired for use by a given individual is identified to the computer system and maintained in an audio output device assignment table.

According to one embodiment, the computer uses the audio output device assignment table and selects the proper address and transmits the audio signals corresponding to the program selected by the first user on the channel assigned to the audio output device identified with that user. In like manner the audio output device desired for use by a second person is identified and a second program's audio signals are transmitted on the channel identified with the second user in the audio output device assignment table. In another embodiment, a single video signal is associated with multiple audio signals. Examples of this include independent instructions for each player of a multiplayer video game, or a speech broadcast in multiple languages to allow simultaneous multi-cultural participation. The audio signals are each independently transmitted on the channel identified with the audio device associated in the audio output device assignment table with an individual user. Each person wearing a headset hears only those audio signals which correspond to the specific audio output of the program source they have selected. When an individual wishes to receive a different audio program on the audio output device the user informs the computer which then assigns the selected audio signals to the proper audio output device.

In yet another embodiment, the computer system assigns each program source's audio signals to predefined channels. The audio output devices receive multiple channels and are dynamically tuned by the listener as common receivers are digitally tuned or tuned in an analog manner. The listener is able to easily switch between the programs which are contemporaneously transmitted at any given point in time.

Another embodiment of the present invention comprises a remote control device which controls one or more of the program sources. The remote control device is associated with a particular audio output device. When the viewer selects a program with the remote control device, the computer assigns the audio output from the selected program to the audio output device that is associated with that remote control device. When a person is viewing a multi-program display on a monitor (for example picture-in-a-picture television or a multi-window computer display), the remote control is used to switch between the various windows, making one the "active window". Because the audio output device is associated with the remote control the audio portion is coordinated by the computer with the current active window and the viewer is not required to independently tune the audio output device.

In a further embodiment, a graphical user interface uses icons to represent both the remote control devices and the audio output devices. By standard drag-and-drop techniques, an audio output icon may be dropped onto a remote control icon to "attach" the audio output device to the remote control device such that applications selected by a cursor controlled by the remote control device have their associated sound automatically routed to the audio output device. An audio output icon may also be dropped on a program or program icon to directly associate its audio to the audio output device.

BRIEF DESCRIPTION OF THE DRAWINGS

FIG. 9A is a top view of a hand held remote control device in one embodiment of the present invention.

FIG. 9B is a cut away side view of a hand held remote control device in one embodiment of the present invention.

FIG. 9C is a cut away side view of an alternative hand held remote control device in one embodiment of the present invention.

FIG. 17 is a diagram of an audio output device assignment table as described in one embodiment of the present invention.

FIG. 18A is a diagram of the audio output device assignment table after it is updated as described in one embodiment of the present invention.

FIG. 18B is a diagram of the audio output device assignment table after it is further updated as described in one embodiment of the present invention.

FIG. 18C is a diagram of the audio output device assignment table after it is further updated as described in one embodiment of the present invention.

DESCRIPTION OF THE PREFERRED EMBODIMENT

In the following detailed description of the preferred embodiment, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims. Numbering in the Figures is usually done with the hundreds and thousands digits corresponding to the figure number, with the exception that the same components may appear in multiple figures. Signals and connections may be referred to by the same number or label, and the actual meaning should be clear from the context of use.

Figure 1A:
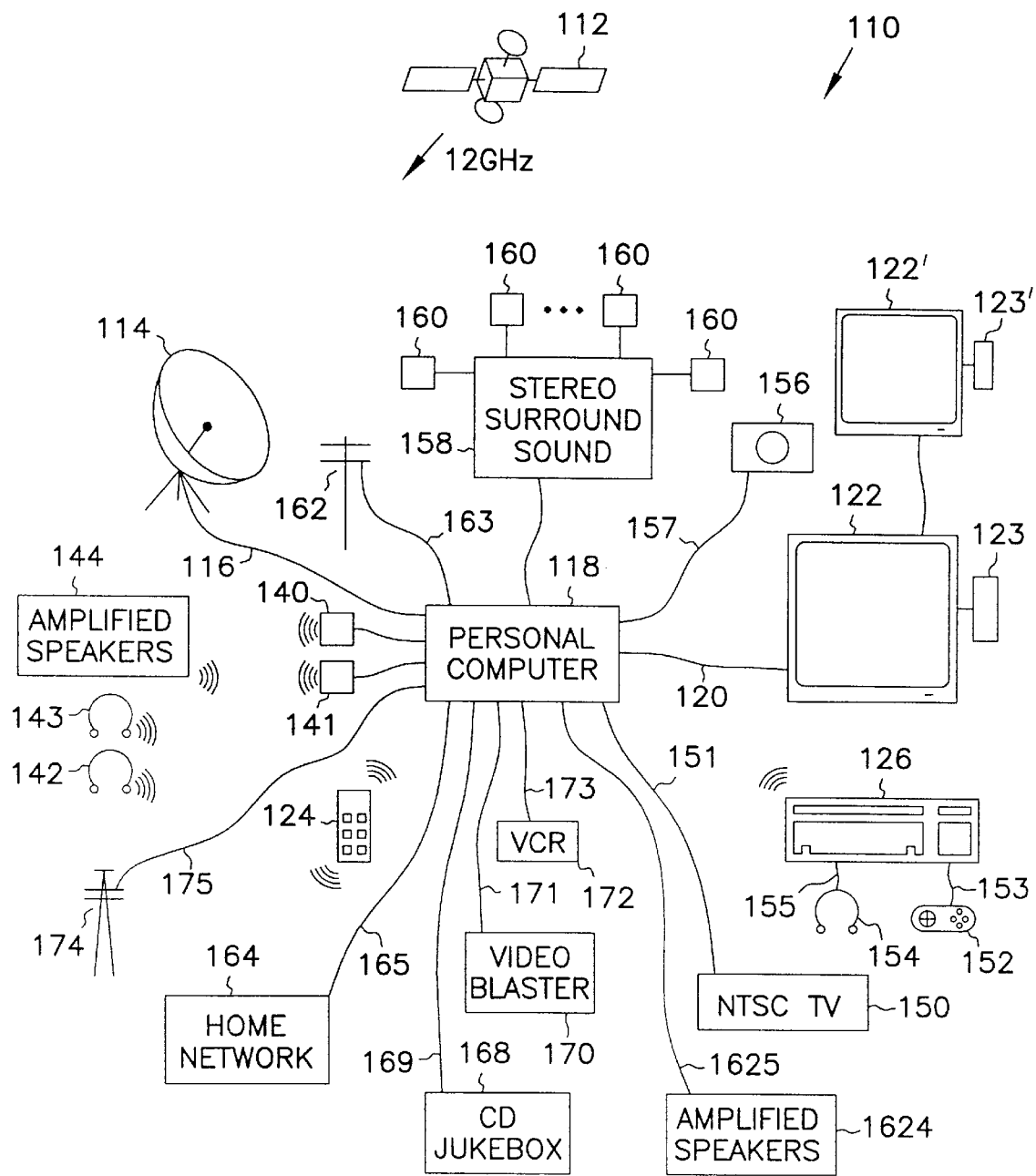
FIG. 1A is a block diagram of a home entertainment system for processing and displaying high quality video in accordance with the present invention.

In FIG. 1A a home entertainment system is shown generally at 110. External to the home entertainment system, a satellite 112, which in one preferred embodiment is a HS601 operated by Hughes at a 101 degree west longitude geosynchronous orbital location, transmits signals comprising 150 channels of modulated digital video, audio and data signals at a frequency of about 12 GHz. The satellite signals are received by the home entertainment system 110 by an antenna 114 containing a low noise block converter amplifier. The antenna is preferably about 18 inches in diameter and receives left and right hand circularly polarized signals between 12.2 and 12.7 Ghz. The antenna provides a downconverted spectrum signal between 950 and 1450 MHz via a coaxial cable or other suitable communication medium 116 to a system device 118, such as a personal computer or other system or circuitry capable of processing data. Suitable antennas are already being manufactured and sold by RCA Corporation by direct sales and through numerous major retail chains such as Radio Shack. The system 118 contains circuitry and software to further processes the signals from the antenna, generally demodulating and decoding the signal to produce a VGA signal. The VGA signal is provided via a standard VGA compatible monitor cable 120 to drive large screen data quality monitors 122, 122' suitable for viewing in a family room or entertainment type room environment. It is contemplated that monitors will become much larger, potentially covering a substantial portion of a wall, making it likely that multiple programs will be viewed at the same time by many people.

Audio signals are decoded and converted to digital data streams. The audio digital data streams are converted by computer 118 back into audio signals. Audio signals are transmitted or communicatively coupled to receivers such as stand-alone amplified speakers 1624, speakers associated with the monitor 123, or RF transmitters 140, 141 over a transmission medium such as twisted pair or coax cable. The RF transmitters 140, 141 transmit sound signals via RF waves over a 900 MHz local transmission band extending from approximately 902 MHz to 928 MHz. Wireless headsets 142, 143 are each equipped with a tuneable RF receiving unit for receiving the audio signals transmitted from one or the other of the RF transmitters. U.S. Pat. No. 5,349,386, entitled "Wireless Signal Transmission Systems, Methods, and Apparatus", describes one such transmission system. As an alternative or in addition wireless speakers 144 equipped with a tuneable RF receiving unit for receiving the audio signals transmitted from one or the other of the RF transmitters are also included.

The system 118 provides for user input by means of remote controls 124 and 126. Remote control 124 comprises a handheld size device with standard television controls and numeric keypad, and in one embodiment, VCR controls and a pointing device. It provides RF control signals received by the system 118. Remote control 126 is a full function personal computer keyboard, with additional standard television and VCR controls, pointing device which is preferably in the form of a touch pad, and it also provides RF control signals to the system 118. RF control signals were selected over IR or hardwired in one embodiment due to the home entertainment environment. It allows the system to be in a different room from the monitors 122, 122', or if in the same room, a clear line of sight is not required. In another embodiment, IR control signals were selected because of the availability of many standard circuitry at low cost. Further detail of the remote control devices is provided below.

Figure 2:
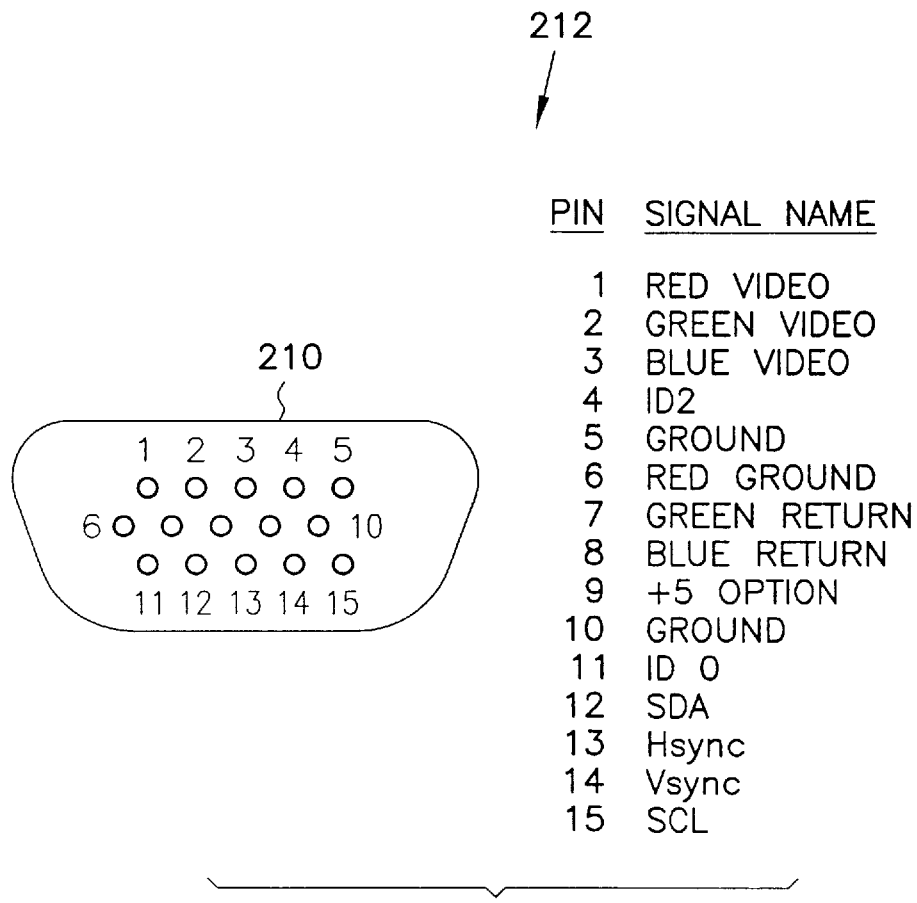
FIG. 2 is a top view representation of the end of a shell connector for coupling to a monitor in accordance with the present invention.

The monitor cable 120 is a standard type cable typically used on VGA display devices, and comprises up to fifteen electrical conductors, interfacing with the monitors 122, 122' in a D series shell connector indicated at 210 in FIG. 2. The fifteen leads, some of which are blank, end in pins in the connector which is a molded over, shielded, triple row, 15 position, subminiature D, straight male plug. The leads are labelled and identified in a table indicated generally at 212 next to the representation of shell connector 210. The monitor contains a suitable female connector for receiving the male shell connector 210.

The monitors 122, 122' in FIG. 1A are preferably capable of displaying at least VGA quality data and video. At least 640 by 480 pixels of resolution are displayable on the monitors. Alternative monitors of higher quality, such as SVGA providing an even greater number of pixels are also used in a further embodiment. Many common graphics cards support multiple such formats, providing great flexibility. The tube size is 33 inches with a diagonal viewing size of 31 inches. An alternative tube size of 29 inches with 27 inch viewing area is lower cost and more suitable for an entry model entertainment system. Monitors 122, 122' preferably contain an analog tube with an aspect ratio of 4 by 3, support VGA input, have a dot pitch of approximately 0.8 to 0.95 millimeters for the 33 inch tube and 0.65 to 0.8 millimeters for the 29 inch tube with a misconvergence of 1 to 1.5 millimeters, a bandwidth of 15 Mhz, a brightness of about 33 FL. One CRT which may be used is manufactured by Mitsubishi, having a model and type number of M79KKZ111X. The above specifications may easily be modified for larger tube sizes, but are designed to provide optimal viewability from a distance of less than two to about four meters for a combination of data and high quality video. If the viewing distance is desired to be less, the tube size and dot pitch should be decreased. If the tube size is not decreased, more pixels would need to be displayed for adequate viewing of data. SVGA monitors providing more lines would be more appropriate. Standard digital monitor controls to control brightness, contrast, vertical and horizontal sizing and positioning, on/off (rest/resume) are also provided, with both a user accessible manual control panel, and circuitry for receiving control information from personal computer 18 in via monitor cable 120. Further embodiments of monitor 22 include larger displays of 35 and 40 inches viewable and LCD large projection screen type displays. Both aspect ratios of 4:3 and 16:9, commonly referred to as wide screen are supported.

Figure 1B:
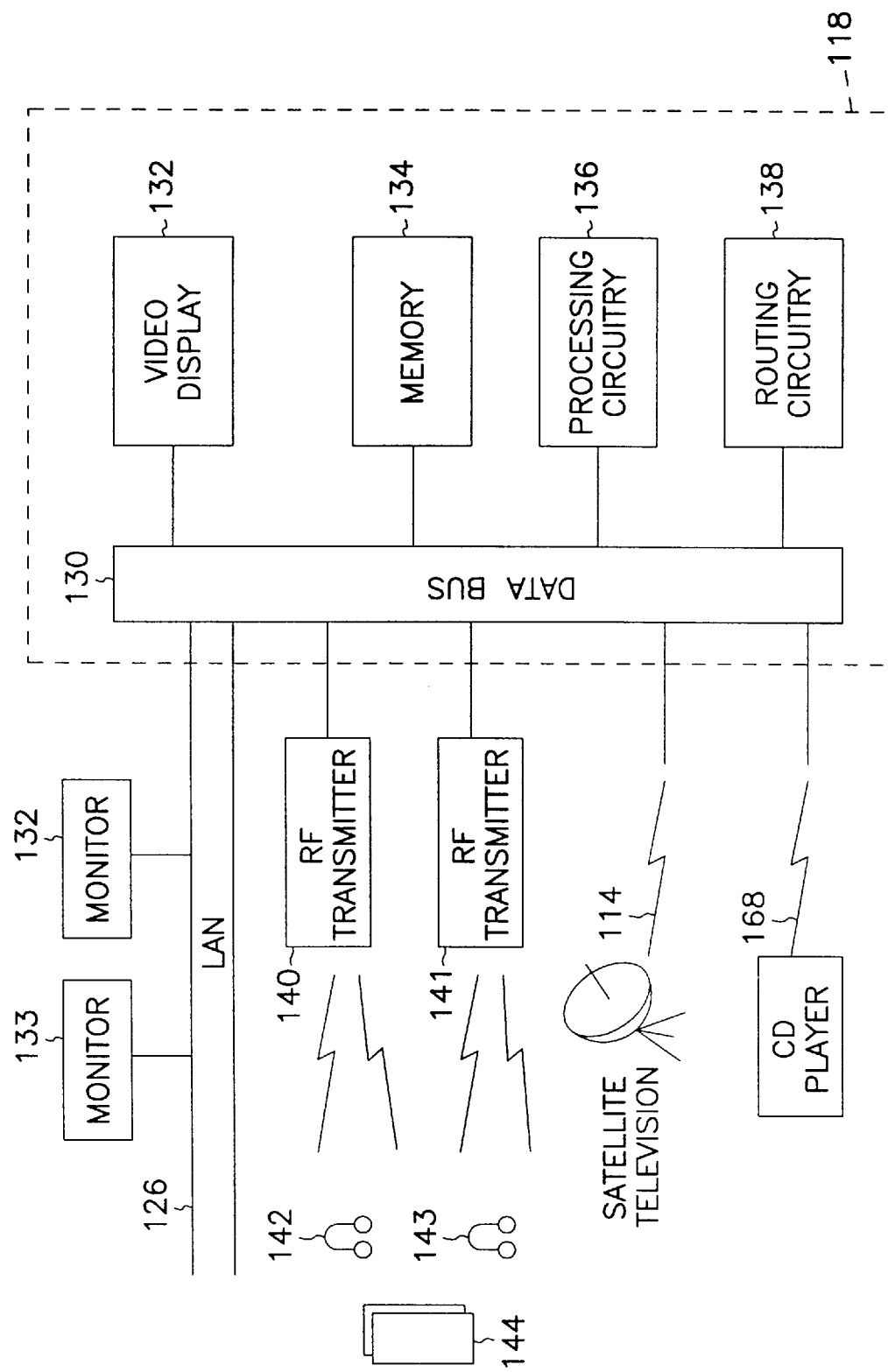
FIG. 1B is a block diagram showing a portion of the home entertainment system of FIG. 1 in greater detail.

FIG. 1B shows a block diagram representing a portion of the entertainment system shown in FIG. 1A. System 118 comprises a video display 132, memory 134, processing circuitry 136, and routing circuitry 138 all communicatively coupled to a data bus 130. All of these components, except for the routing circuitry 138, are common to personal computers and are not discussed further. Further details of routing circuitry 138 are discussed infra. In an alternate embodiment, the routing circuitry 138 is replaced with routing software executing in the computer's processing circuitry 136. Among other components coupled to the data bus 130 are RF transmitters 140, 141, satellite television 114, and CD player 168. RF transmitters 140, 141 transmit audio signals over the 900 MHz local transmission band extending from approximately 902 MHz to 928 MHz. A first transmitter 140 is tuned to first channel within the specified band, and a second transmitter is tuned to a second channel within the specified band. Remote audio output devices (comprising headsets and speakers) 142, 143, 144 are each comprised of independently tuneable receiver units for receiving the audio signals transmitted by RF transmitters 140, 141. Each audio output device 142, 143, 144 may receive audio signals transmitted by any of transmitters 140, 141 regardless of which channel other audio output devices may be tuned to. Each RF transmitter 140, 141 is uniquely addressable and is tuned to a unique channel within the specified band. According to one embodiment, each audio output device 142, 143, 144 is paired with a transmitter and assigned a unique identifier, and the assignment information is stored in a table such as that represented by FIG. 17. In the embodiment shown, the present invention comprises a computer program contained on computer readable storage media. When the system of the invention is initialized, the transmitter assignment table 1700 pairs each transmitter address 1710 with an audio output device identification 1720.

Figure 3:
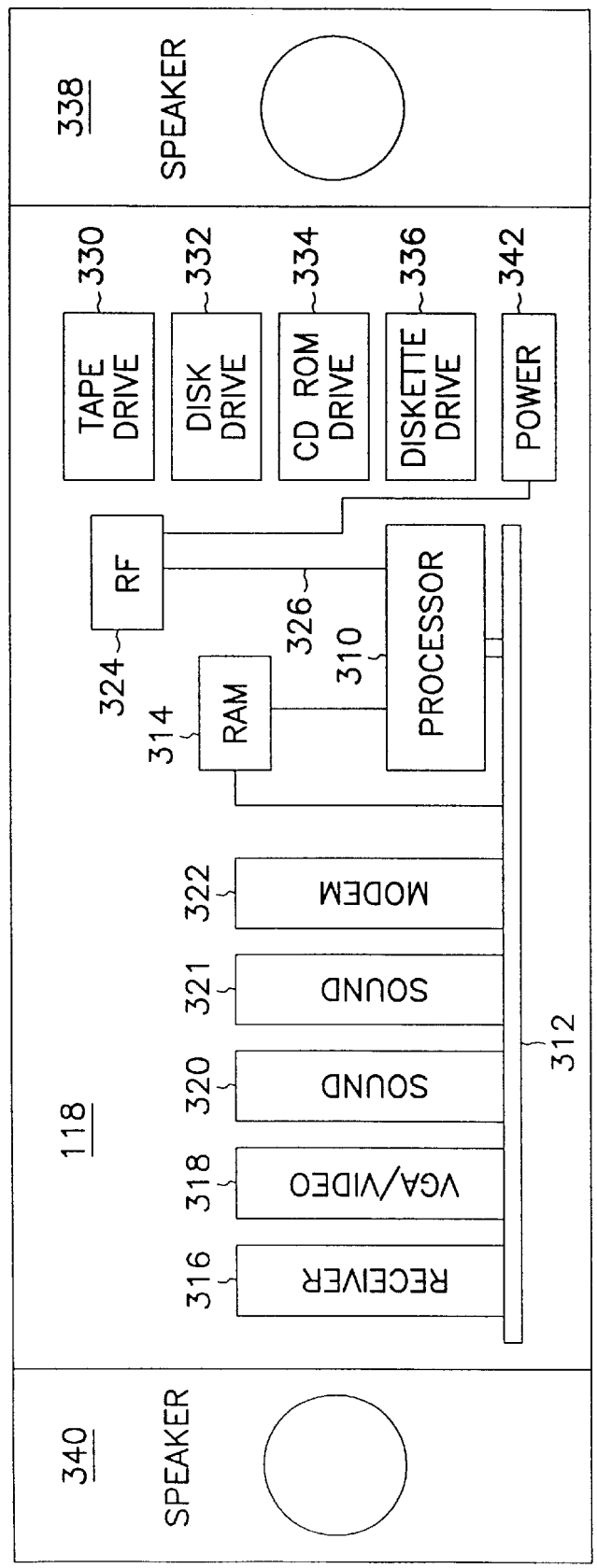
FIG. 3 is a block diagram showing major components of a personal computer in the home entertainment system of FIG. 1A.

Further detail of the functional blocks of system 118 are shown in FIG. 3. A processor 310 resides on a system board containing an industry standard PCI bus 312. A random access memory 314 is coupled to both the processor 310 for direct access, and to the PCI bus 312 for direct access by other components also coupled to the PCI bus 312.

The other components comprise a receiver 316, video graphics adapter, VGA converter card 318, sound cards 320, 321 and modem 322. An RF receiver 324 is coupled to standard keyboard and mouse ports, which in turn are coupled through a standard keyboard/mouse adapter to an ISA bus 326 to processor 310. Both keyboard 126 and handheld remote 124 transmit RF signals identifying the key pressed, as well as a signal identifying the source of the key signal. The RF signals are typically in the megahertz range, but can also be IR or other suitable form of radiation. RF signals have the advantage over infrared "IR" signals in that they are not interrupted by someone walking between the remote and the receiver. This is especially important during a drag and drop type of activity. If the signal is interrupted for example, a needed document might be dropped on a trash can icon, causing the document to be unintentionally deleted. Light source interference and jamming of other IR receivers is minimized by using RF signals. It may also be used in a different room from the receiver.

RF receiver 324 receives the RF signals, which provide indications of the keys being pressed along with the identity of the remote control device sending the signal. RF receiver 324 comprises an ISA board or module plugged into both standard keyboard and mouse ports. The board contains RF receiver circuitry which receives the RF signals, decodes them and routes them to the appropriate port for processing. A system controller program running on processor 310 supervises software drivers which are programmed to distinguish between the sources, and control which program the remote key signals affect. If the handheld remote is activated, the key signals usually would control what channel is being displayed, or cause a recorded program to fast forward, play or reverse. It could however be selected to move to the next image in a program designed to display pictures taken on a digital camera. Keyboard keys are more likely to control a computer program application such as a word processor, spread sheet or electronic mail program. However, the television like controls might be used to override the remote hand held television controls in channel selection.

Further elements of the preferred embodiment of the present invention include a tape drive 330 for backup of data and storage of video information, such as a movie or other program, a fixed disk drive 332 for storing programs and data, a CD ROM drive 334, and a diskette drive 336, all as commonly known in the personal computer art. A pair of speakers 338 and 340 are also provided. A power supply and associated control circuitry is indicated at 342, and is coupled to the RF receiver 324 to receive signals representative of power on and power off commands from the remote control devices. Power circuitry 342 maintains power to the RF receiver 324 even when the rest of the system is shut down to ensure that the power on signal is received and executed. To avoid accidental powering off of the system, two consecutive power off signals must be received before the system is powered down.

In one preferred embodiment, processor 310 is a 100 mhz Pentium processor, RAM 314 comprises a minimum of 16 megabytes, disk drive 332 is a 1.5 gigabyte IDE hard drive, the CD ROM drive 334 is a quad speed, 3 disc changer, and the fax/modem is a standard 28.8 kbits per second modem. It should be noted that components in personal computers are getting faster, smaller and cheaper with higher capacity.

It is easily anticipated that larger memories and faster modems and processors will be preferable over the next 20 plus years. In an alternative preferred embodiment, a very high speed processor 310 is used, and receiver 316 simply comprises circuitry to transform received signals into a digital format. The remainder of the functions of the receiver 316 and VGA card 318 are performed by software routines to receive, tune multiple simultaneous channels, decompress, perform error checking and correction and convert the digital signals into digital VGA format. The VGA card 318 in this embodiment simply comprises a digital to analog converter.

Figure 4:
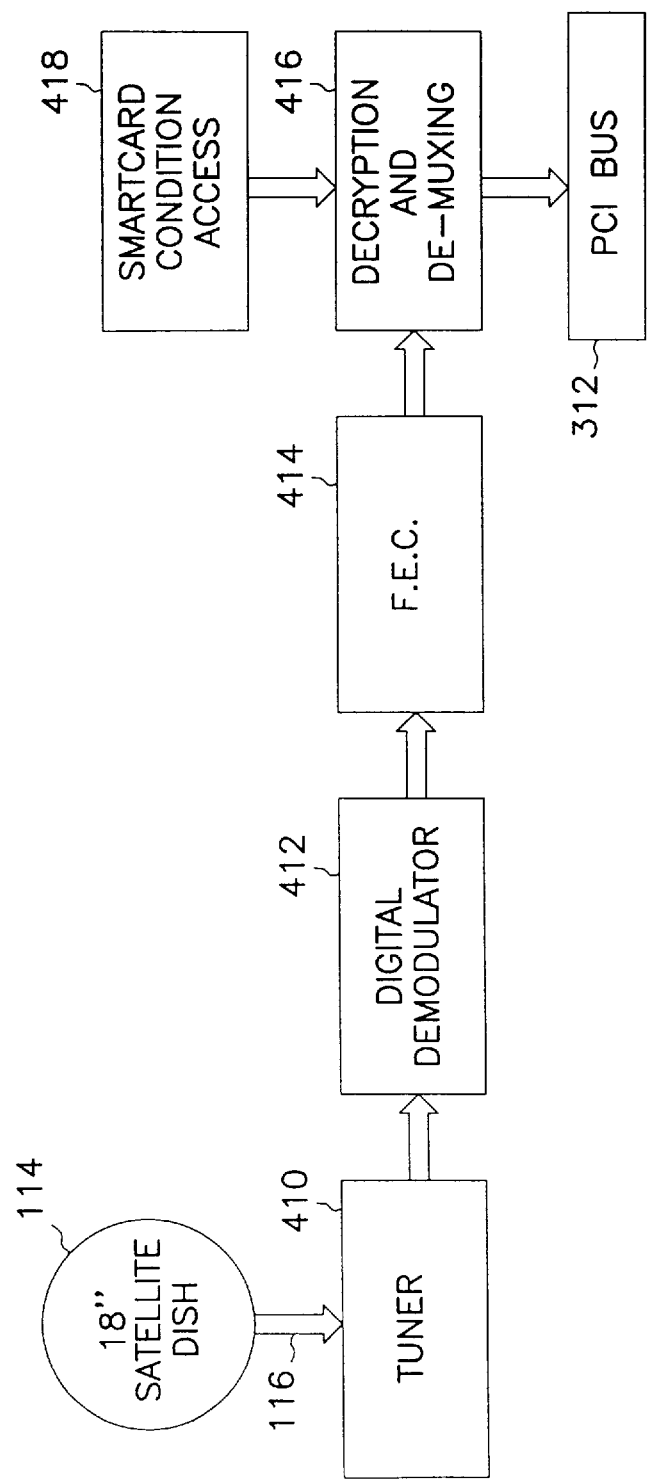
FIG. 4 is a block diagram of a tuning circuit in the personal computer of FIG. 3.

Receiver 316 is shown in further detail in FIG. 4. A tuner 410 receives the direct broadcast signal from antenna 114 via standard coaxial cable 116. The broadcast signal is 150 channels of high-quality television, including data, compressed in accordance with motion picture expert group, MPEG-1 standards with MPEG-2 expected to be available in the near future. The information is carried on an approximately 12 gigahertz carrier, and the receiver 316 selects channels from the carrier and performs analog to digital conversion of the signal. A demodulator 412 is coupled to tuner 410 for demodulation of the digital signals. Forward error correction is provided via standard Viterbi and Reed Solomon algorithms at block 414. The output of block 414 comprises an encrypted digital signal in accordance with data encryption standards "DES." While it is not important to precisely reproduce the video signal, it is much more important to get the data such as computer programs and financial information accurately. The above error correction algorithms are designed to reduce the error rate for data to $10^{-12}$ errors per byte of data. For video and audio, an error rate of $10^{-8}$ is acceptable. The error corrected encrypted digital signal is supplied to a decryption and demultiplexing block 416. Block 416 is coupled to a conditional access card 418 which provides the key for decrypting the digital signal. Upon separating the multiplexed digital decrypted signal, it is provided as digital MPEG conforming signals via a connector 420 to PCI bus 312.

In operation, when processor 310 executes a command, such as changing a channel, it sends the command over the PCI bus 312 to receiver 316, where tuner 410 tunes in a different channel, and the video signals are processed and sent on to VGA card 318 and sound cards 320, 321. Once on PCI bus 312, the digital MPEG signal may follow several different courses. In one embodiment, a buffer is allocated from RAM 314 to hold a user selected amount of compressed video data or information comprising computer programs. The same buffer concept may be applied to disk drive 332, which is useful for holding an even larger amount of information. Tape drive 330 is preferably an 8 millimeter tape device, and is useful for storing entire programs of data or MPEG compressed video/audio information. The tradeoffs for each storage device are clear, with the cost of storage per megabyte increasing with the speed with which it may be retrieved. Hence, while RAM provides very fast access, it is a limited resource, and does not make sense to use for much more then a few seconds of video related data. Also, it is a transitory memory in that it does not persist if power is removed. It is most useful for buffering about 10 seconds worth of video information. While it is not possible to predict how long a block of data will play when converting to video, 10 seconds is about 15 megabytes of data. The tape drive 330 is the cheapest form of data storage, but is not randomly accessible. In other words, it can take some time for the tape to move to the right place before desired data can be retrieved for playing. However, it does provide the most cost effective storage for linear playback of movies and television shows. A disk drive 332 is has an average access time of about 10 milliseconds, making it a nice tradeoff between tape and RAM for buffering portions of video information and allowing the user to select and quickly play back desired buffered video. It, like tape is also persistent.

When the MPEG data is buffered, a FIFO type of buffer is used, with new information written over the oldest information when the buffer is full. Through use of the television and VCR remote controls on handheld remote 124 and keyboard 126, VCR-like instant replay functions are provided from the buffered MPEG data. The buffered data is sent back under processor 310 control via the PCI bus 312 to the VGA card 318 for display on monitors 122, 122'.

Figure 5:
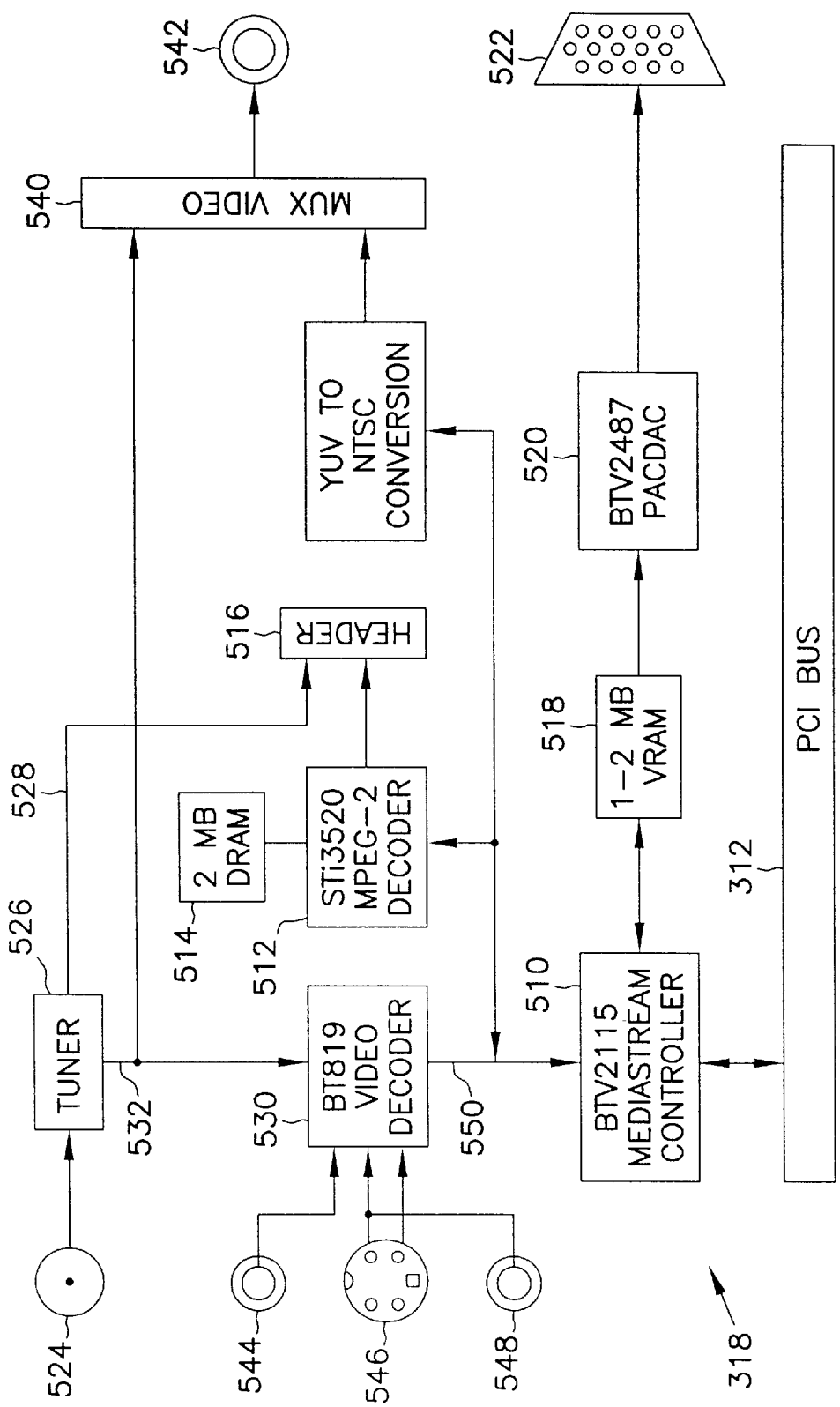
FIG. 5 is a block diagram of a video graphics adapter in the personal computer of FIG. 3.

The VGA card 318 is now described with reference to FIG. 5. In FIG. 5, a controller 510 is coupled to the PCI bus to receive MPEG encoded video, and other normal personal computer display information such as graphics and text. If controller 510 detects MPEG data on PCI bus 312, it routes it to a decoder 512 with associated dynamic random access memory of 2 megabytes, DRAM 514. Decoder 512 decodes the MPEG data in accordance with MPEG standards. A commercially available chip from SGS-Thompson Microelectronics, part number STi3520 is one such chip which performs the decompression. DRAM 514 is used as a buffer to assist in the decoding, since large amounts of data are required at one time to decode MPEG data. Audio information from the decoded MPEG data is provided to a header 516 for transmission to the sound cards 320, 321. The decoded video signal in YUV color encoding is provided back to controller 510 which then places the video information into a dynamic random access memory or video random access memory, VRAM 518. A converter 520 retrieves the information from VRAM 518 and generates standard analog VGA display signals on a cable adapter 522 which mates with shell 210 in FIG. 2 for display.

Other audio video inputs are provided on VGA card 318, including a standard cable connector at 524 coupled to a video tuner circuit 526. Tuner 526 provides both an audio output on line 528 to header 516, and an audio video signal to a video decoder 530 via line 532. Line 532 is also coupled to a video multiplexer 540, which selects one of at least two NTSC compatible audio video signals it receives to an audio video out panel connector 542. Video decoder 530 also receives audio video inputs from further panel connectors, comprising RCA jack 544, S-video pin 546 and a second RCA jack 548. The video signals provided on these lines are decoded by decoder 530 into YUV video output on line 550, which also receives decoded MPEG signals from decoder 512. Both these signals are available for display by VGA display via controller 510 without conversion to NTSC. An alternative is to route the signals on line 550 to a YUV to NTSC converter 552, which feeds video multiplexer 540 for display on a standard television of NTSC signals. However, conversion to NTSC results in an inferior picture being generated from what is received in either S-video or from the antenna 114 as represented by the MPEG signals on PCI bus 312. By not converting to NTSC, the entire transmitted image may be displayed. Prior art NTSC conversion lead to a cropping of the image to ensure that the image presented was not degraded at the edges. The present invention provides the ability to scale for provision of the entire transmitted image without quality loss at the edges, since it provides a digital video signal. No overscan is required as is needed to ensure smooth display borders for NTSC analog transmissions. Video signals comprise video data which includes but is not limited to graphics, text, still and motion video, broadcast or cable television—any image capable of being displayed on a video monitor.

Figure 6:
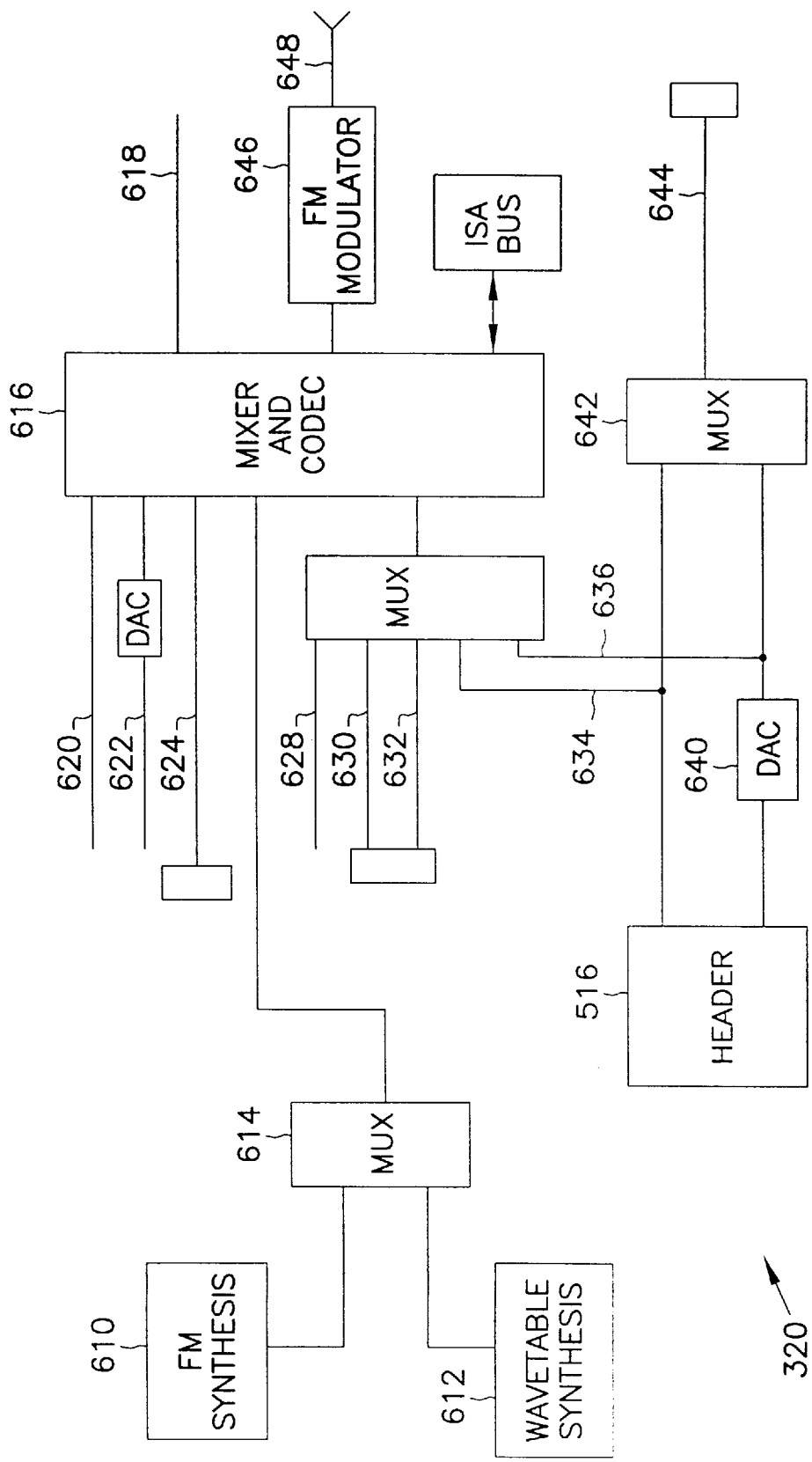
FIG. 6 is a block diagram of an audio card in the personal computer of FIG. 3.

Sound card 320 is shown in further detail in the functional block diagram of FIG. 6. A second sound card 321 is essentially equivalent to the card shown in FIG. 6, except that it is set to a different COM port and interrupt level. Both FM synthesis and wavetable synthesis are provided at 610 and 612 respectively. Their outputs are mixed or multiplexed at 614 and provided to a mixer and coder/decoder 616 which provides a line out 618 containing Sound Blaster compatible output for connection to standard speakers if desired. In a further embodiment, surround sound compatible output is provided. Mixer 616 also has a microphone input line 620, a CD audio digital line in 622 one embodiment, and a CD audio analog line in 624. A multiplexer 626 also multiplexes multiple input lines into mixer 616. A line in 628 and two audio/video lines 630 and 632 are multiplexed by multiplexer 626, as are signals received from header 516 via lines 634 and 636. Line 634 is coupled through header 516 to tuner 526, providing an audio signal from channels on cable connector 524. Header 516 is also coupled to MPEG decoder 512 to provide MPEG PCM audio through digital to analog converter 640 to line 636. Lines 636 and 634 are also coupled through a further multiplexer 642 to provide a line out of VCR compatible audio on a line 644.

Figure 7:
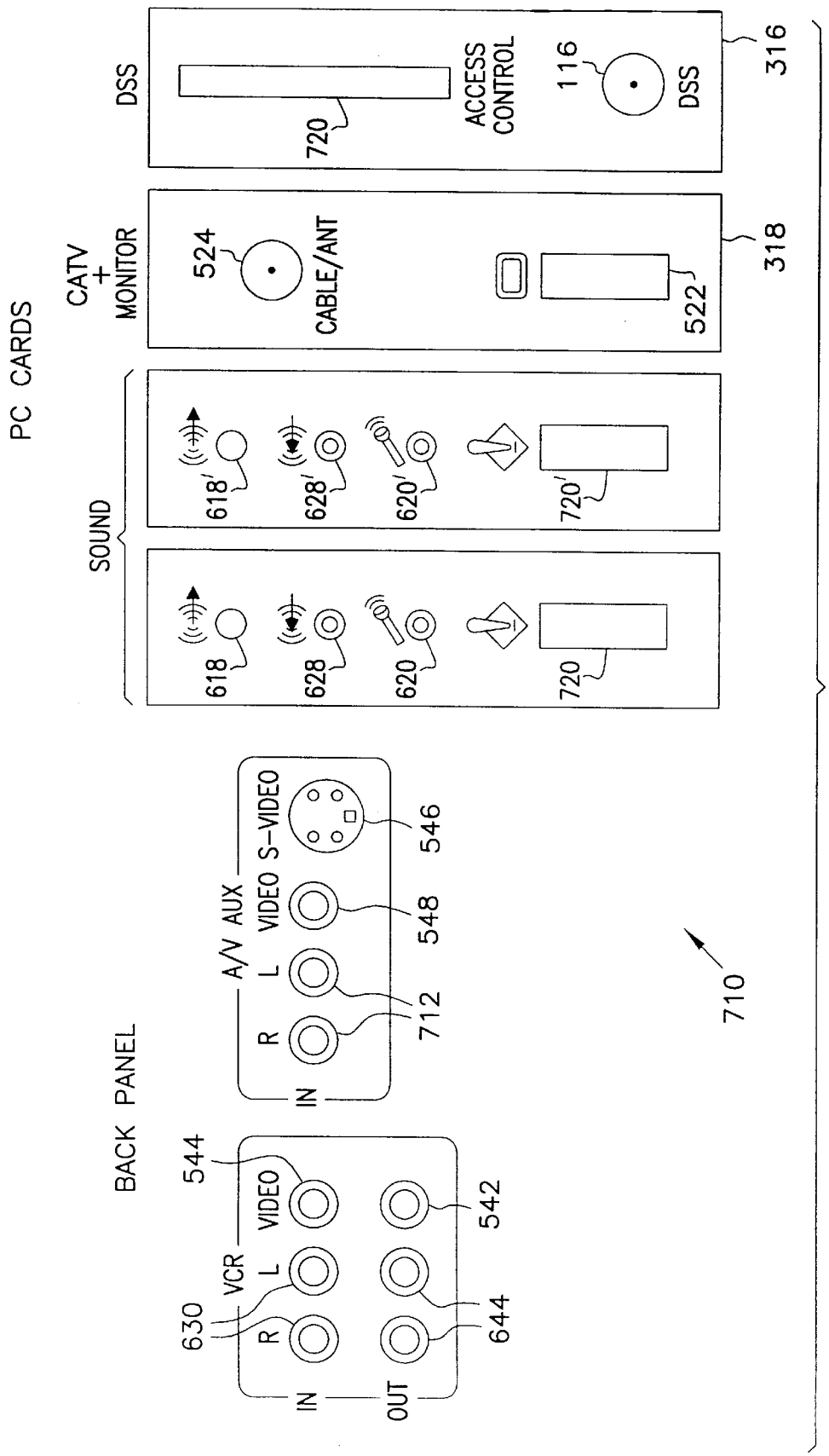
FIG. 7 is a block diagram showing input and output connectors which are provided in the personal computer of FIG. 3.

FIG. 7 shows multiple ports available on the back panel of the personal computer 118, and on the cards shown in FIGS. 4, 5 and 6. The back panel connections are shown generally at 710. The audio video inputs comprise RCA jack 544 and audio left and right speaker connectors 630 for receiving audio video input from a VCR or game machine, S-video pin 546 and auxiliary RCA jack 548 for receiving audio video input from a VCR, camcorder or laserdisc and left and right audio connectors 712. Audio video out connectors 542 and 644 are available on the back panel 710 for coupling to a VCR for recording. Sound cards 320, 321 contain connectors 618, 618', 620, 620', 628 and 628' on the mounting bracket, plus game ports 720, 720'. VGA card 318 contains the coaxial cable connection 524 and the VGA output port 522. Digital receiver card 316 contains the coaxial cable connector to coaxial cable 116, and a slot for the conditional access card 418 indicated at 720. Slot 720 may be a standard PCM/CIA slot (also referred to as CardBus or PC Card), or any other type of connector desired, such as one specified by News Datacom, who is providing such cards for DSS set top boxes. By providing the above connectors and ports on the back side of the personal computer, they are accessible for easy wiring, but also out of view in the home entertainment center.

Figure 8:
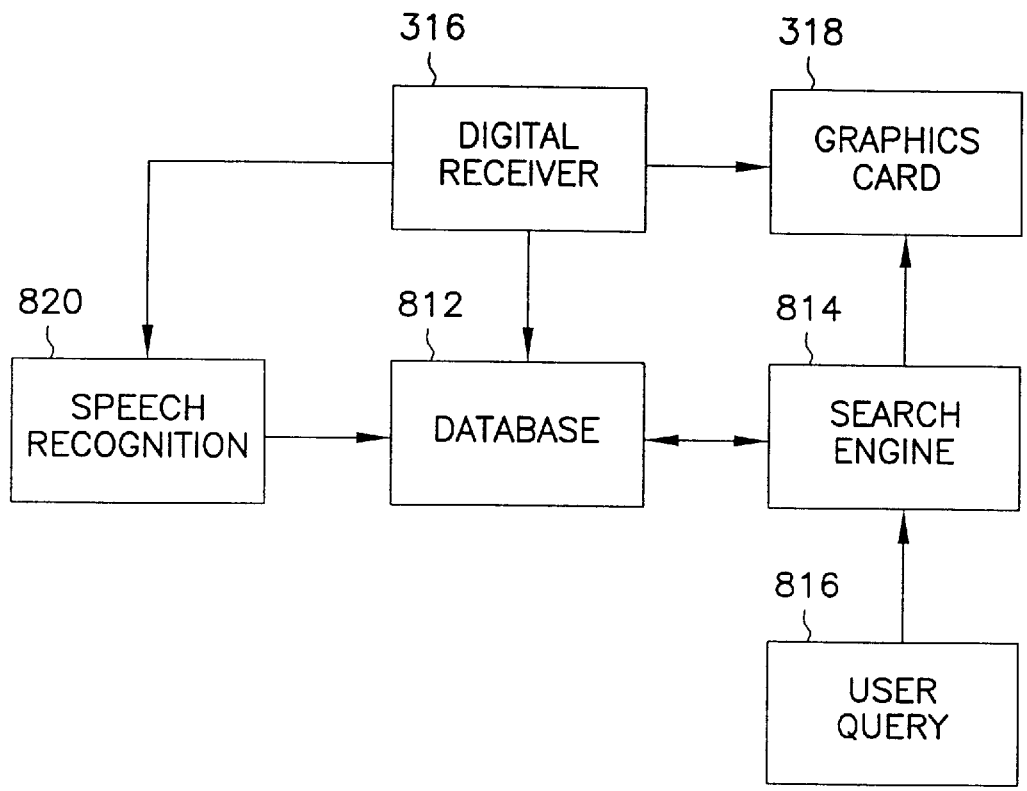
FIG. 8 is a block functional diagram showing the functional elements of a database storing programming information which can be displayed on the system of FIG. 1A.

The DSS signal on coax cable 116 also contains data relating to television programming scheduling and closed caption information. In some video broadcast services, the closed caption information is contained in the vertical blanking interval of video signals. This information is captured by the receiver 316 and separated out from the video and audio signals, and provided on the PCI bus to RAM 324 where it is accessible to processor 310. It can also be stored on any other storage device capable of storing text or other digital data. As shown in FIG. 8, the text is stored directly into a database 812 on RAM 324 or disk drive 332. In one preferred embodiment, database 812 comprises flat files of the entire text provided by receiver 316. No organization is applied to it other than sequential as received. A search engine 814 running on processor 310 accepts user queries indicated at 816 in the form of key words. All standard commercial database query functionality, such as proximity searching, query by example, wildcard letters, etc are applicable. Search engine 814 then applies the query to the database 812 and supplies the results back through the VGA card 318 for display. The data is preferably formatted as specified by the user, most likely in terms of the title of the program, the time that it will be on, and the channel that it will be on. Further information, such as descriptions of the program, and at least partial credits including director and actors may also be specified to be provided by the user. Closed caption information is stored separately from the programming information and may be queried separately. Where a separate data channel contains all the closed caption information for the channels containing video information, it is easy to store the closed caption information for all the channels. However, if it is required to decode each video MPEG channel, then only the closed caption information from one channel at a time is stored. An auto surf function cycles through desired channels, picking up portions of closed caption information, which can then also be searched. This is very useful when looking for current event type programming. Perhaps a user is interested in a particular place, or when a particular feature on a desirable topic starts. A query to review all the current and past mentions of the place or feature during live programming can quickly alert the user to broadcasts satisfying the query. Where closed caption is not supported, the sound track from video is fed into a speech recognition program 820 running on processor 310 which recognizes at least a few words from current television programming, and will improve with time and advancement in linguistic parsing. For now, only the words that are recognized are fed into yet another partition of the database which can be independently searched.

Various views of the hand held remote control 124 are shown in FIGS. 9A, 9B, and 9C. A 19 millimeter optical trackball 910 is integrated into the remote, and functions just as any other pointing device for personal computers, generating cursor control signals that are transmitted to the personal computer 118. In a further preferred embodiment, the cursor control device is a miniature joystick shown at 911 in FIG. 9C, that is operated by a finger being placed on top of the stick and pushing in the direction of desired cursor movement. Selection buttons, or mouse clickers are provided at 912 for the user to press to select functions on the personal computer that the cursor is touching. An additional trigger like selection button is provided at 913, which is convenient for use by an index finger if holding and pointing the remote in a natural position. It is also useful as a pseudo trigger for many games, and for one handed dragging and dropping of icons.

A power switch is provided at 914 to provide power-on/off functions for the monitors 122, 122' and resume/rest for personal computer 118. Channel control buttons 916 provide the familiar television/VCR up and down channel control functions. Volume controls 918 are also provided, as is the standard number keypad in television remote controls indicated generally at 920. Further provided are mute button 922, channel recall 924, FAV (favorite channel or menu) button 926 and TV button 928, which serves to cycle the display through full screen display of a television program, to putting it in a window, to hiding it completely. An additional function set control button 930 is used to select functions provided by an operating system beyond those normally provided today. Much as the "Ctrl" and "Alt" keys are used to select different functions, the function set button 930 is similarly used on the hand held remote 124 to select the functions defined by the operating system. FAV button 926 may be unique to each family member, and comprise a listing of the users favorite television programs, games, computer application programs, home pages on internet, or other interfaces into the electronic world.

Hand held remote 124 also contains RF generating circuitry coupled to all the keys and pointing devices for generating RF signals corresponding to the buttons pressed for reception by RF circuitry 324. The power of the RF signal is adjustable via a thumbwheel indicated at 934, which is coupled to further power adjusting circuitry shown in FIG. 12. Power is provided by a standard 9 volt cell 936, or multiple double "A" batteries, accessible via a removable panel 940.

Figure 10:
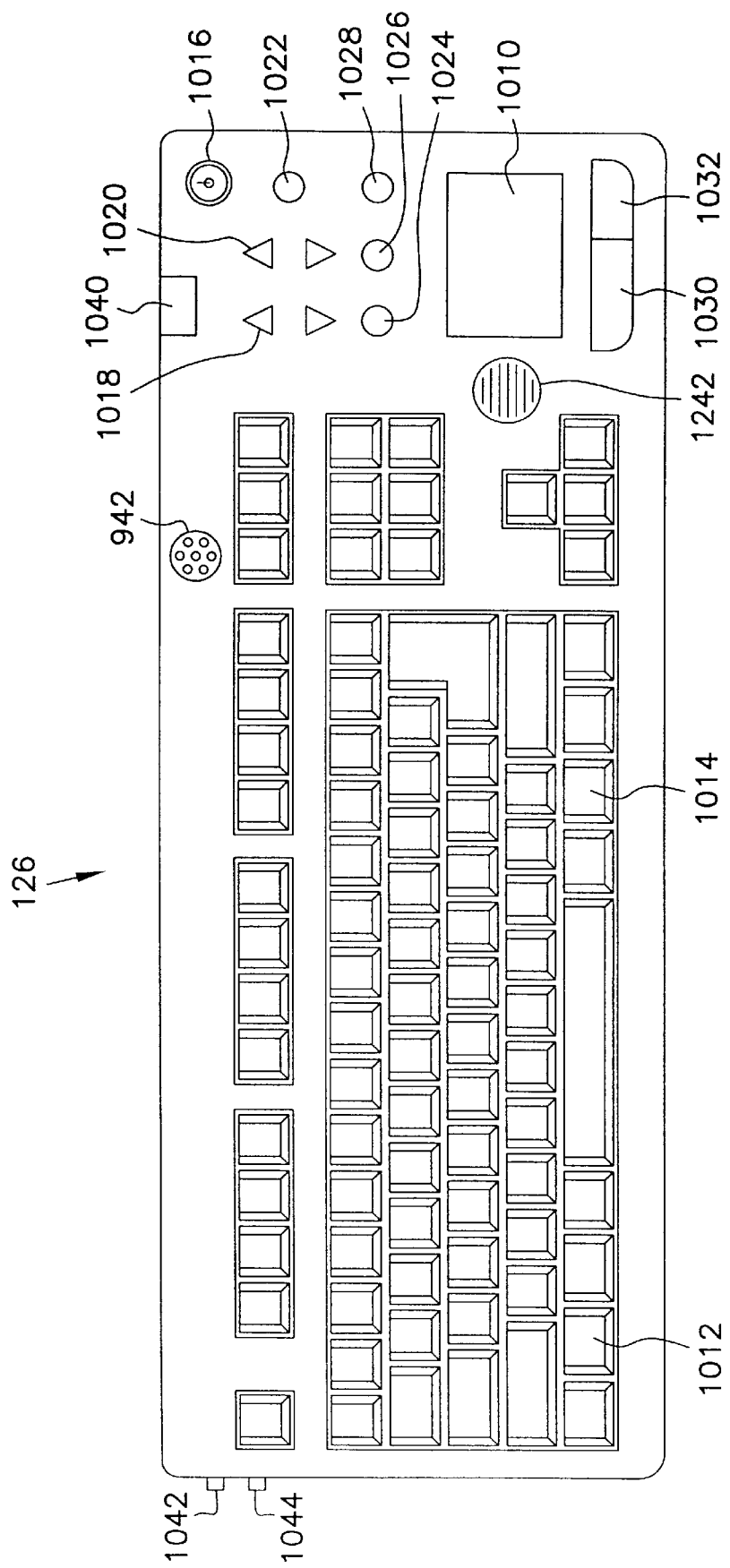
FIG. 10 is a top view of a keyboard remote control device in one embodiment of the present invention.

Remote keyboard 126, shown in further detail in FIG. 10, is very similar to a MF II keyboard, except that the numeric key pad has been replaced with television/VCR like remote control buttons, and a touchpad indicated at 1010. In addition, it contains a pair of function set keys 1012 and 1014 for invoking the same functions as button 930 on handheld remote 124. The television/VCR buttons include a power button 1016, volume controls 1018, channel controls 1020, TV/VCR button 1022, mute button 1024, a favorite channel/function button 1026 and a channel recall button 1028. In addition, selection keys 1030 and 1032 are provided to select function indicated by the cursor as controlled by touchpad 1010. Touchpad 1010 is integrated into the remote keyboard, and permits easy manipulation of the cursor by simply moving an object, such as a pen, stick or finger/finger nail across the pad in the desired direction. It can be useful for performing signatures to validate transactions, or restrict access to files. By integrating a touchpad directly in the remote keyboard 126, there are no external connections, or sliding drawers to contend with, which could easily become clogged with grease, butter, sugar or any of the other messy things people eat while being entertained in a family entertainment center. The portion of the keyboard containing the television/VCR remote controls is preferably sealed, and impervious to being affected by such foods and drinks as are commonly found in a family room. Since the keyboard is more likely to be heavily used, a higher number of double "A" batteries are used. Four to eight provide a suitable length of operation. They may be rechargeable, and an external power jack 1042 is provided to allow the keyboard to be plugged into standard electrical utility power supplies.

As with the handheld remote 124, the keyboard remote 126 comprises RF generating circuitry 1040 to provide RF signals for reception by RF circuitry 324 in personal computer 118. RF circuitry 1040 also adds on a keyboard identifier with the signals it transmits, which identifies each keystroke as originating from the keyboard. In one embodiment, it is a set of bits that is unique to the remote device. This helps prevent inadvertent interference from other owners of similar home entertainment systems from inadvertently controlling the users system. In another embodiment, the frequency is shifted slightly from that emitted by the handheld remote, and RF circuitry 324 detects the bits, or the frequency shift and identifies the keystrokes as originating from either the handheld remote, or the remote keyboard which is associated with the system. In yet a further preferred embodiment, multiple remotes are provided, each with its own identifying frequency or code, including joysticks for controlling games. In this manner, each individual in the room can be controlling their application or program in a window, or be playing different parts in a game. Since all remotes would be sending the same signals to represent the same functions, the drivers for such remotes running on processor 310 need not differ. They need only be designed to handle multiple different sources of the keystrokes, button strokes, mouse, stick or touchpad signals.

Figure 11A:
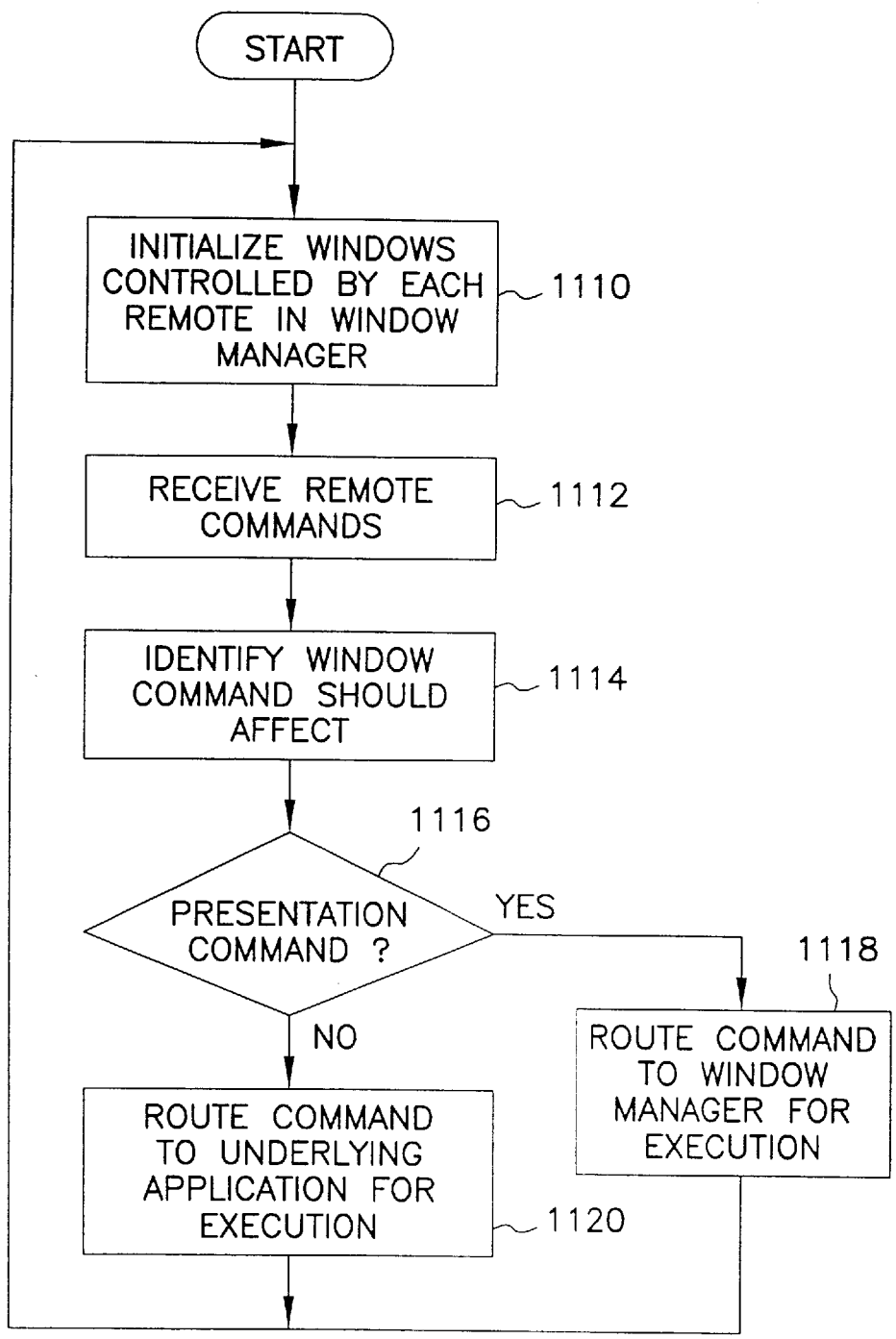
FIG. 11A is a high level flow diagram showing how commands from the remote controls of FIGS. 9A–c and 10 are processed.

A high level flowchart showing how commands issued from different remote control devices are interpreted by processor 310 to control different applications is shown in FIG. 11A. When an application is started in a Windows 3.11 or 95 environment, it is initialized as shown at 1110 to be associated with a particular remote. The keys or buttons from such remote are identified in groups of either "keyboard" or "TV" or "game" type keys. Game type keys would be those associated with the stick, trackball or mouse type of pointing devices. Thus, an application could be associated with game keys from the handheld remote for one player of a game, and game keys from the keyboard remote for a second player. Further remotes, or different groups from a remote could be used for further players. When RF circuitry 324 receives signals from a remote, it identifies the command, such as what key was pressed, and which remote device it came from to processor 310 at step 1112. Processor 310 then identifies the application in a window to which is should be applied. If it is a presentation type of command, such as enlarging a window or opening a window as determined at 1116, the command is routed to the window manager for execution at 1118. If not, it is executed on the application that the group it is associated with was initialized to at step 1110. In further preferred embodiments, individual keys are associated with applications, however, at least one group or key is always associated with the underlying operating system to prevent a user from being locked out of other applications. One further use of the above system is to assign TV/VCR controls to television programming associated with a window. In this manner, no cursor need be present in the window, blocking the television programming in order to perform channel selection. In addition, if someone else is watching a program in a different window, their channel selection controls will only affect their window.

Figure 11B:
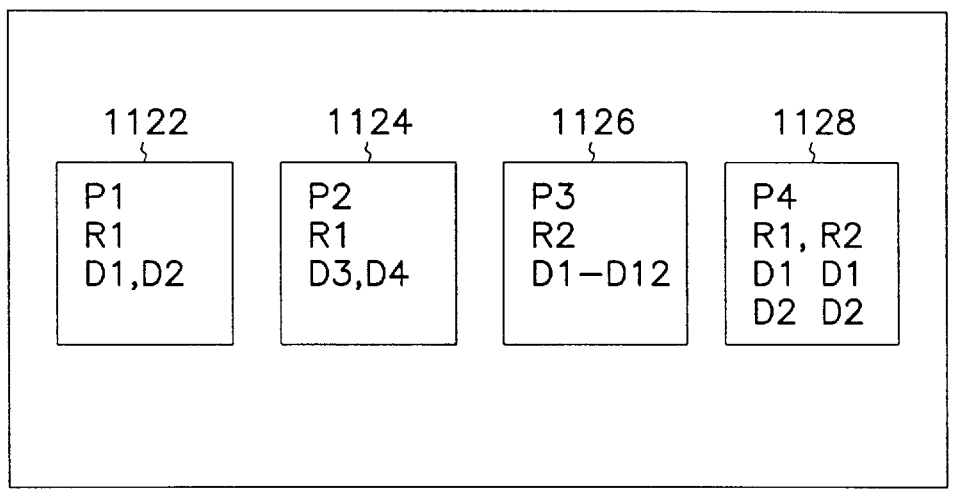
FIG. 11B is a high level block diagram showing the association of remote control devices to applications.

A block diagram in FIG. 11B represents tables formed by a program manager to associate remote control devices and the input devices on the remote control devices to programs. Programs, as used herein refer to computer application programs and television programs, both of which are controllable by remote control devices. A first program 1122 is associated with a first remote controller, R1, whose input devices D1 and D2 control the first program. D1 and D2 correspond to the alphanumeric keys, such as a computer keyboard keyset, or subset thereof, or a cursor control device, or even the television control pad previously discussed. Second, third and fourth programs 1124, 1126, and 1128 are also associated with remote control devices, and in some instances multiple remote control devices. Fourth program 1128 is controlled by input device sets D1 and D2 of remote R1, and D1 and D2 of the second remote R2. The low level granularity of associating sets of keys to applications provides great flexibility for a multiuser home entertainment system.

In a further embodiment, FM headsets are provided to enable each person to hear only the sound that is associated with their window of programming. According to one embodiment the sound associated with each program is assigned to one of several standard FM frequencies and broadcast in low power, much like that in a drive in movie theater, and each headset is tunable to the frequencies broadcast. In another embodiment, each headset is tuned to a different single frequency, and the user selects the windows whose sound will be broadcast on which frequencies. The top most window in such a set of windows will have its audio so broadcast. A given window or programming may have one or more independent audio streams associated with the single video stream. Where there is more than one audio stream each audio stream may be independently associated with a different headset such that multiple viewers watch the same video output but hear different audio programming.

Figure 12:
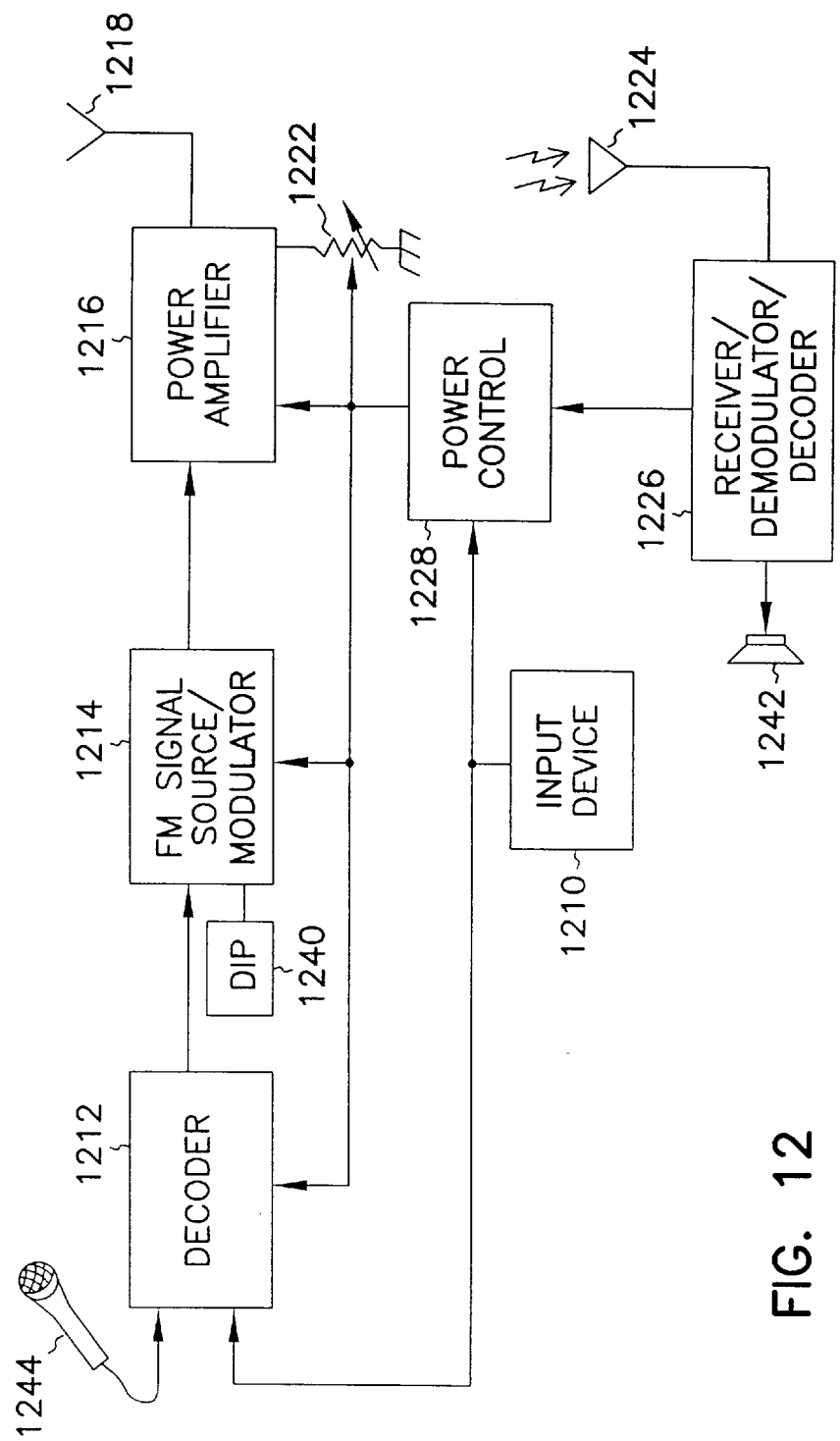
FIG. 12 is a block diagram showing power adjustment controls for the remote control devices of FIGS. 9A–c and 10.

Further detail of RF circuitry in the remote control devices is shown in FIG. 12. An input device, comprising the keyboard or hand held remote is indicated at 1210. When a key, touchpad command, trackball etc command is activated, it is provided to a decoder 1212, which decodes the command into a signal representative of the command to be transmitted. It also adds a header and check bits to the signal to be transmitted, indicating a unique identification of the remote. The identification in one embodiment is a digital signal which is unique for each remote control for one system and stored on an EE-PROM, while in a further embodiment, the code is an eight bit, or a 16 bit code which results in over 64,000 different combinations, making it unlikely that neighbors within range will have remotes with codes that will control a user's system. The unique identifier may also be represented by selecting a different frequency for each remote control device. The system uses this unique identification as described above to determine which program should be affected by the particular command issued from the particular remote that issued it.

The Decoder 1212 provides a decoded signal to an FM signal source and modulator 1214, which in one embodiment generates a desired RF signal in the 900 megahertz region of the electromagnetic spectrum. This signal is provided to a power amplifier 1216, which amplifies the RF signal and provides it to an antenna 1218 for transmission to the system. The power amplifier 1216 consumes most of the power in the remote control device. A potentiometer 1222 is provided to reduce the gain of the amplifier so that it is not always amplifying the signals at the highest power level. Since users will vary the distance they are from the system, there is no need to always transmit at the maximum power level. If a user is close to the system, the user may adjust the power level downward by turning the thumb wheel on the remote in the appropriate direction until the system no longer receives the transmissions. In one embodiment, the receiver in the system detects the signal strength received, and provides visual feedback on the display to assist the user in setting the power level to a level where no errors in transmission due to low power signals are likely to result. Such signal power level detectors are well known in the art, and one example is shown in U.S. Pat. No. 5,193,210. In a further embodiment, the RF receiver 324 also comprises an RF transmitter, and provides an RF signal representative of the power level back to the remote, which is received by a receiver antenna 1224. Antenna 1224 is coupled to a receiver/demodulator/decoder 1226 which decodes the signal and provides a digital signal representative of transmitted signal strength back to a power control circuit 1228. Power control circuit 1228 is coupled to the potentiometer 1222 for adjustment of the gain of power amplifier 1216 based on the signal strength feedback from the system. Power control circuitry 1228 is also coupled to the input device, to sense when commands are entered. It is also coupled to the other components to control when they are supplied power. During touchpad and trackball operation, power is supplied continuously to all the electronics. However, after a predetermined period of time, approximately 1 second, with no further commands being sensed, the power control circuitry 1228 cuts off power to most of the other circuitry, and only turns it back on within milliseconds when activity on the input device 1210 is detected. When other circuitry is powered off, the power control circuit remains active, along with the receiver 1226. The power control circuit 1228 buffers commands until the other circuitry is ready to process the commands. Since it turns back on quickly, there is no perceptible delay by the user.

In a further embodiment, each input device command transmitted is acknowledged by the system with an echo of the command. When no acknowledgement is received, the power control circuitry 1228 instructs the decoder to send the signal again, while increasing the power level until the system properly acknowledges the command. All other commands are buffered in the power control circuitry until successful transmission of the command, whereupon they are transmitted at the new adjusted power level. In one embodiment, the times for rebroadcast are randomly chosen, and prevented if the receiver 1226 detects transmissions from another remote control device or the system to prevent interference. This is not done if each remote has its own transmission frequency, which is settable by a DIP switch 1240.

Figure 13:
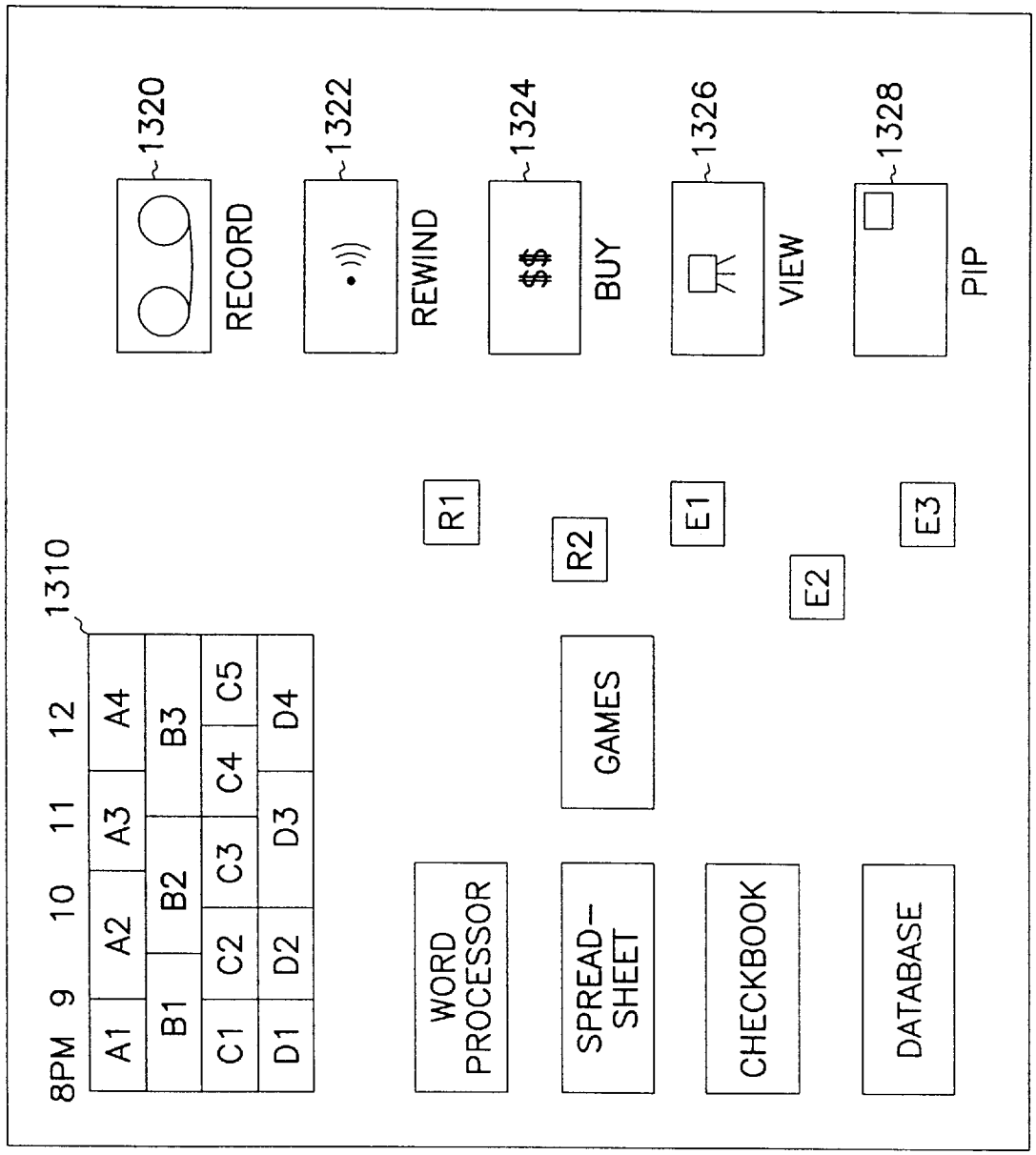
FIG. 13 is a block diagram representation of a user interface displayed on the screen of the present invention.

One example of the advantages of having a full function computer operating in conjunction with broadband video is that it opens up the power of a personal computer to control the video streams and advanced user functions. The interface to the broadband video is much more user friendly. In FIG. 13, one example is shown, with a standard television like schedule indicated generally at 1310. It comprises a timeline across the top, starting at 8 PM and progressing to midnight. Four channels, A, B, C and D are shown, but many more may be available. Other programs, such as games and word processors which may be selected in standard double mouse click fashion are also shown. Both the time frames and the number of channels shown may be modified by the user enlarging the window using standard Windows based navigation techniques. Multiple cells, or programs are shown on each channel, and are represented as a suffix of the channel letter for discussion herein. In actuality, program titles and descriptions appear be inserted in each cell. By clicking on a cell with the right mouse button, further details appear in an expanded version of the cell.

Several icons are tied to functions controlled by the system. A record icon 1320 is tied to either a separate video cassette recorder, the tape drive, or the disk drive to record selected channels. A program cell may be indicated for recording by dragging the cell with a mouse control and dropping it onto the record icon. Similarly, a reminder may be set by dropping a program cell onto a remind icon 1322. If a pay per view program is desired, one simply drags the program cell, which is perhaps outlined in green, over on top of a buy icon 1324. The buy icon is also used when viewing a home shopping channel, or a catalog in a similar manner. To view a primary program, a user either double clicks on a cell, or drags a cell to a view icon 1326 and drops it there. To place a program into a picture in picture format, a user drags a cell onto a PIP icon 1328. The picture in picture window may then be resized like any other window, or moved to another area of the display. All the icons may also be arranged in an L-shape surrounding a primary channel being viewed so that the icons do not interfere with the video images being displayed from the primary channel.

In one embodiment, each remote control device controls a different cursor, shown as R1 and R2 on the screen in FIG. 13. When the cursor is used to select a program, it becomes the primary controller for that program. The keys on the remote are automatically mapped into the program selected. The keyboard however, retains control of the task list, and is capable of selecting a program and becoming the primary control device for that program to the exclusion of the hand held remote control device.

In FIG. 13, icons E1 and E2 represent audio output devices. The personal computer sound cards 320, 321 also contain a multi frequency FM transmitter 646 with antenna 648, and have the capability to generate separate sound tracks for each window being displayed on the monitor or for each of a plurality of separate sound tracks for a single window being displayed. Using standard drag-and-drop techniques, icon E1 or E2 is dropped onto a remote control icon R1 or R2 to "attach" the audio output device to the remote control device such that applications selected by a cursor controlled by the remote control device have their associated sound automatically routed to the audio output device. Icon E1 or E2 is dropped on a release icon E3 to disassociate the audio output device from the remote control device. Double clicking with the remote control icon on the release icon E3 also disassociates the audio output device from the remote control device or another application or window. In another embodiment, remote audio output devices are associated with the individual windows on a multi-window video display by using a cursor controlled by the remote control device. In this embodiment, a viewer using a first remote control device selects an audio output device icon E1 or E2 by double clicking on it.

To determine if the correct audio output icon has been assigned, the user may single click on it, and a soft tone is transmitted to the audio output device, thereby identifying it as the audio output device represented by the icon selected. The user may also manually identify which audio output device they are using via control panel functions. The computer will then, until the user selects the audio output icon again, associate the identified audio output device with that particular remote control device. A first user then selects, for example, the spreadsheet program, one of the programs being displayed in separate windows. When a particular window is thus activated the computer updates a second audio output device assignment table 1800 in the computer memory, shown in FIG. 18a, to reflect the association of the particular program to the particular remote control device. In the embodiment shown the audio output device assignment table 1800 pairs each audio output device identifier 1720 with a remote control identifier 1810 and a program identifier 1820. The computer transmits the audio portion of the program displayed in the selected window to the transmitter associated with the identified audio output device and the user hears the audio portion of the selected program.

A second viewer, using a second remote control device, selects a second audio output device icon E1 or E2. The second viewer then selects a program window with the remote control device. The computer updates the audio output device assignment table 1800 as shown in FIG. 18b. Where the audio output devices being used are headsets, the first and second user can view both programs on the same monitor, and each user hears the audio for only the program they selected. The first user now wishes to listen to the audio for the database program, which is displayed as a window on the monitor or represented as an icon. As shown in FIG. 18c, after the user selects the desired window or icon with the remote control, the computer updates the audio output device assignment table 1800, and the audio portion of the newly-selected program is transmitted to the user's audio output device. It is to be recognized that this same process is applicable to a program window with which is associated multiple audio tracks. The window displayed contains a representation of each available audio track such that each user selects the audio track to which they wish to listen by the aforementioned drag-and-drop or double-click methods.

In a further embodiment, a release audio output device icon E3 or button is provided. When a user double clicks on the icon E3, or double clicks on one of the original audio output device icons E1 or E2, the audio output device is released and available for reassignment. Once released, the audio output device may be assigned to a remote control device or to a particular program, such as an audio CD player. In this manner, the user may listen to music while using yet another program. Audio output devices may also be released via the control panel.

Figure 19:
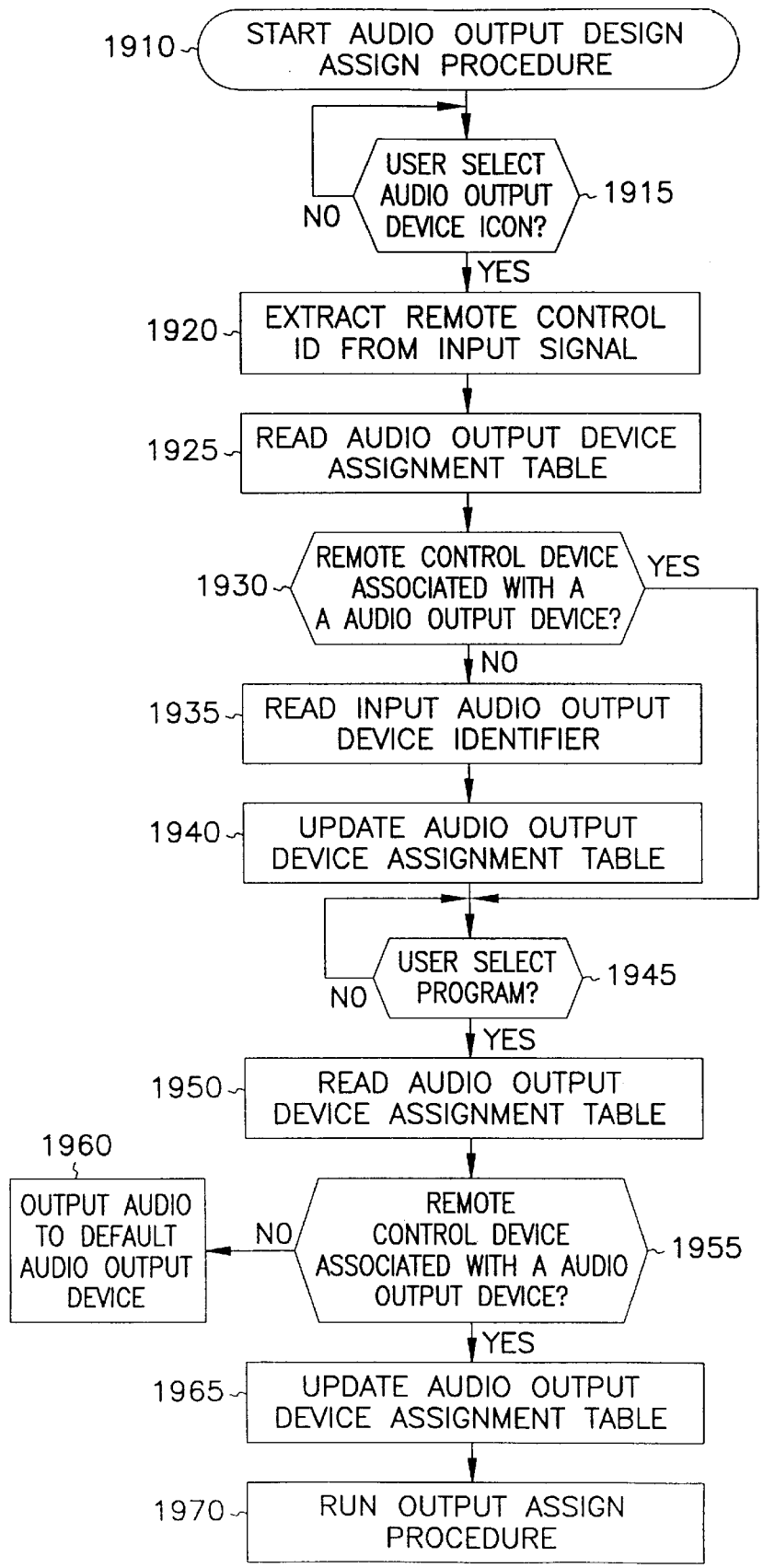
FIG. 19 is a flow diagram representing the process of associating an audio output device with a remote control device and a program according to one embodiment of the present invention.

FIG. 19 is a flow diagram representing the previously described assignment/association process. In one embodiment the audio output device assign procedure 1910 is resident in the computer's operating system. When a user selects the audio output icon 1915 the computer extracts from the signal generated by the remote control device the signal uniquely identifying the remote control device 1920. The computer then monotonically reads each row in the audio output device assignment table 1800 comparing the id extracted from the remote control device-generated signal to the values stored in the remote control id field of each row of the audio output device assignment table 1800. If the remote control device has already been assigned to an audio output device 1930 the computer waits for user input. If there is no assignment for the identified remote control device the computer reads the remote control device identifier 1935 and adds a new row to the audio output device assignment table 1800 containing the id of the remote control device being used and the id of the audio output device that was selected 1940. At this point the program id field is left blank.

Figure 20:
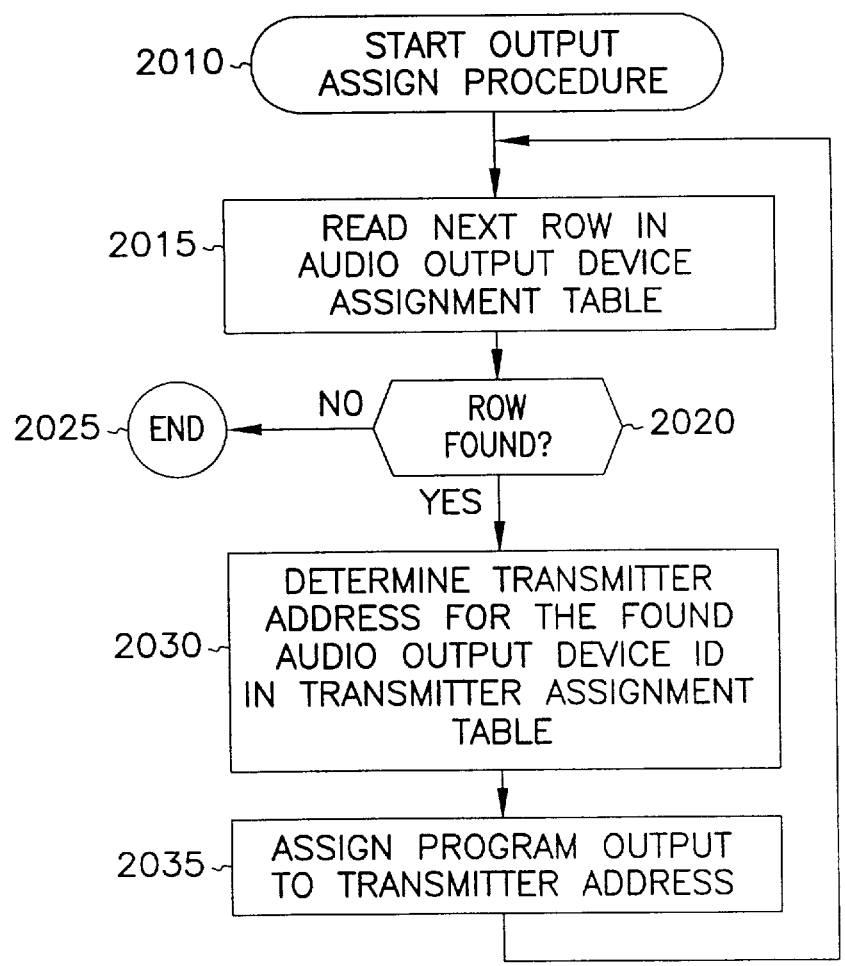
FIG. 20 is a flow diagram of the process of assigning program output to audio output devices according to one embodiment of the present invention.

The computer then waits until the user selects a program with the remote control device 1945. When a program is selected the computer reads the audio output device assignment table 1800 to see if an audio output device is assigned to the remote control device 1950. If there is no such association 1955 the computer directs the program's audio output to the amplified speakers which are associated with the video display 1960. If the audio output device assignment table 1800 shows the remote control device is associated with an audio output device, the computer updates the audio output device assignment table 1800 to reflect the association of the program to the audio output device 1965. The computer then executes the output assignment procedure 1970, one example of which is shown in FIG. 20. The audio output device assignment table 1800 is defined to contain a set of predefined associations which the system recognizes as the standard configuration. The user has the option to display the contents of the audio output device assignment table 1800 in order to view the current status of associations. The contents of any field within the table may be modified to reflect new assignments or the entire table may be reset to the standard configuration.

FIG. 20 is a flow diagram of one embodiment of the output assignment procedure which manages the program audio signals being output to audio output devices. This process 2010 is triggered any time there is a change in the audio output device assignment table 1700. The computer reads the first row in the audio output device assignment table 2015. If the row contains valid assignment information 2020 the computer compares the audio output device id read from the audio output device assignment table row to each entry in the transmitter assignment table 2030. When a match is found the computer directs the audio output for the program assigned to the audio output device id in the audio output device assignment table to the transmitter address assigned to the audio output device id in the transmitter assignment table 2035. This process ends after every row in the audio output device assignment table has been processed 2025.

Figure 14A:
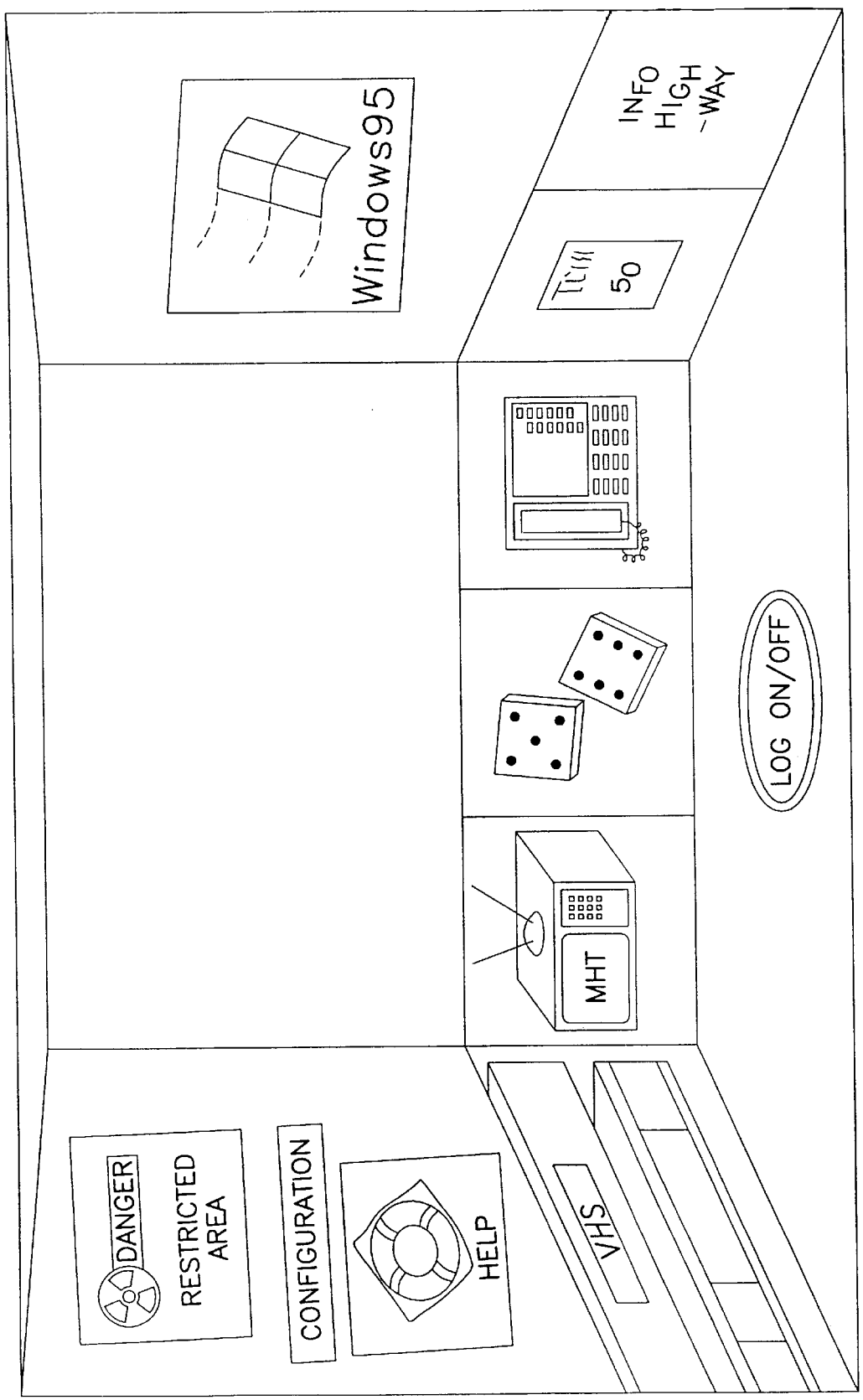
FIGS. 14A–F are block diagram representations of a user interface for interacting with the home entertainment system of the present invention.

A first screen display provided on monitors 122, 122' to users is shown in block diagram form in FIG. 14A. The display comprises a set of icons which are tied to underlying functions in a Microsoft Windows95 or down level version operating environment. This front end is specifically designed to be a replacement shell for the normal Windows operating environment to make it user friendly to a family. It acts as an application manager, allowing the user to launch other applications and utilities from within it. The front end is organized into the following areas, each of which leads to further menus: Entertainment, Information Services, Productivity, and Logon/Help/Configuration controls. The front end utilizes Win32c application program interfaces, and operates both as a shell and as a stand-alone application. It supports drag and drop and is Win95 logo compliant.

Further icons on the first screen comprise a logon icon for bringing up a dialog box asking for the user name and password and a help icon for bringing up a context sensitive help engine with a data file which is related to the screen where the help icon was selected. The dialog box for the logon contains an option for a default, or family logon which may not require a password.

Figure 14B:
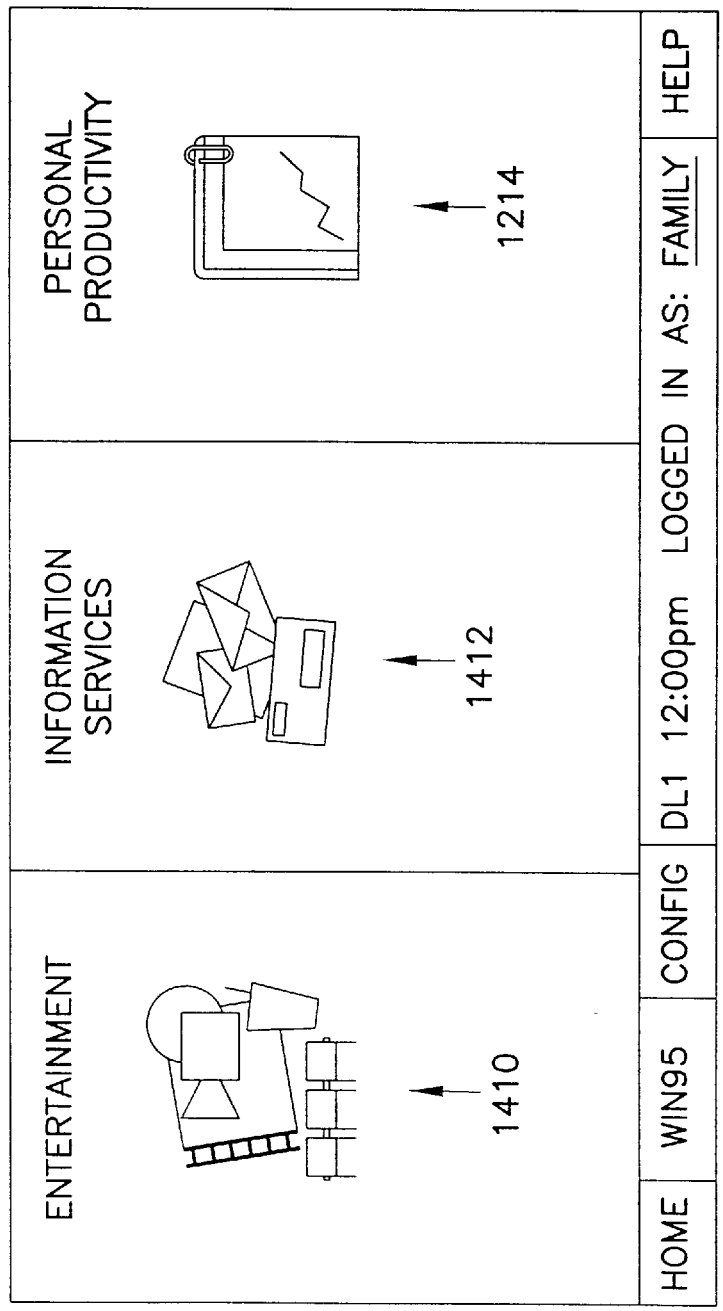
Figure 14C:
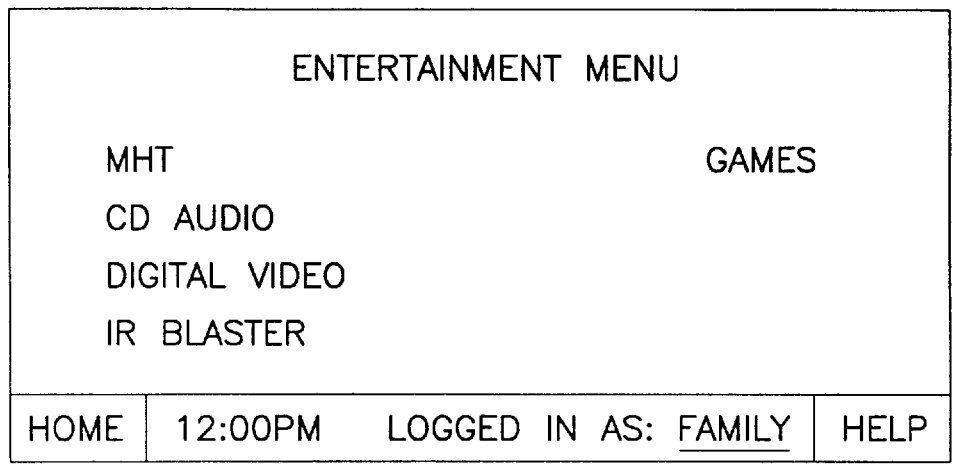

The front end splits the integrated video processing, audio processing and data processing functionality of the entertainment system into different areas of similar functionality as show in the block diagram of FIG. 14B, comprising an entertainment icon 1410, an information services icon 1412 and a personal productivity icon 1414. Each of these icons, when activated by clicking, or from a task list invoke further menus. An entertainment menu in a window on the monitor is shown in FIG. 14C, comprising selections such as Microsoft Home Theater, CD audio, Digital Video, IR Blaster and Games, all of which may be launched from this window. The Games icon provides a user configurable games menu, which has the capability of being user aware, provided the user identified themself at login. The person logged on is also noted at the bottom of the window. Each user is then above to have their favorite games listed when they are logged in. A home icon or control button is active, and takes the user back to the main menu. Help controls are also active, and take the user to context sensitive system and help information.

Figure 14D:
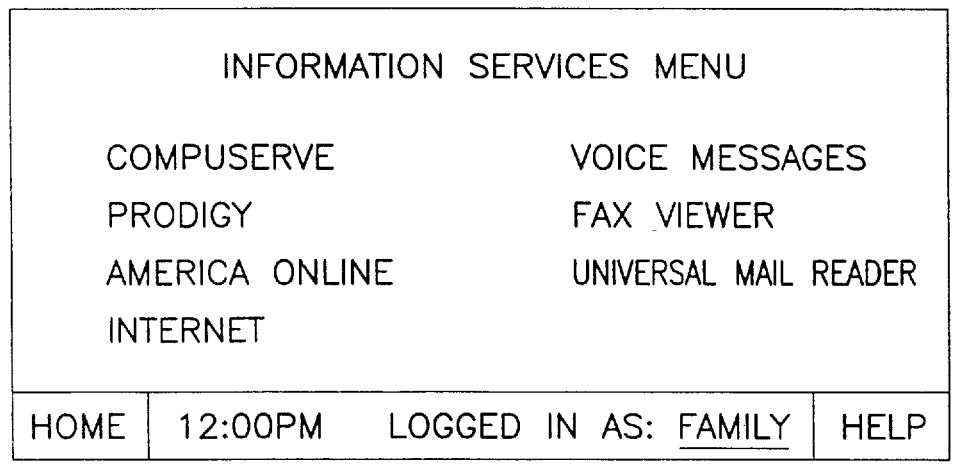

The Information Services icon 1412 leads to a further Information Services Menu as shown in FIG. 14D. Many commercially available information services are launchable, as well as telephony related functions tied to the modem, such as voice messages, fax viewing and mail readers.

Figure 14E:
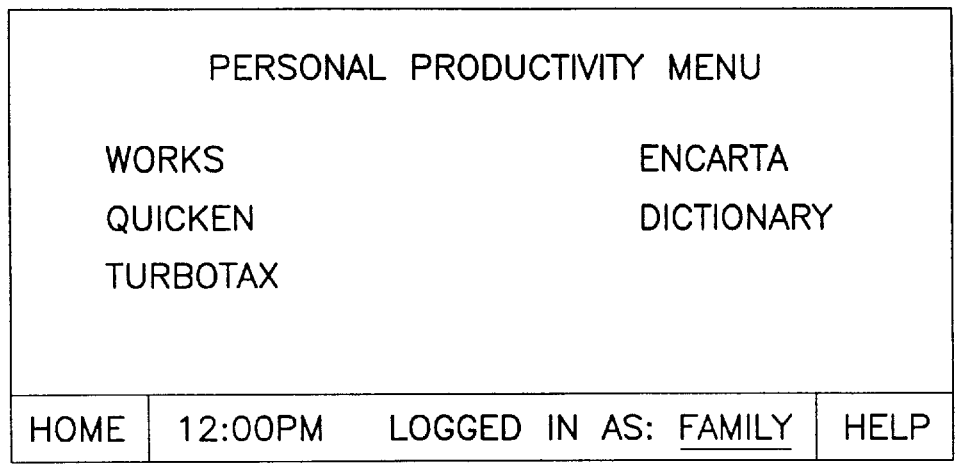

The Personal Productivity icon 1414 leads to a Personal Productivity menu in FIG. 14E, where personal productivity software is launchable. While shown as a text based list, the applications may also be represented by icons.

Figure 14F:
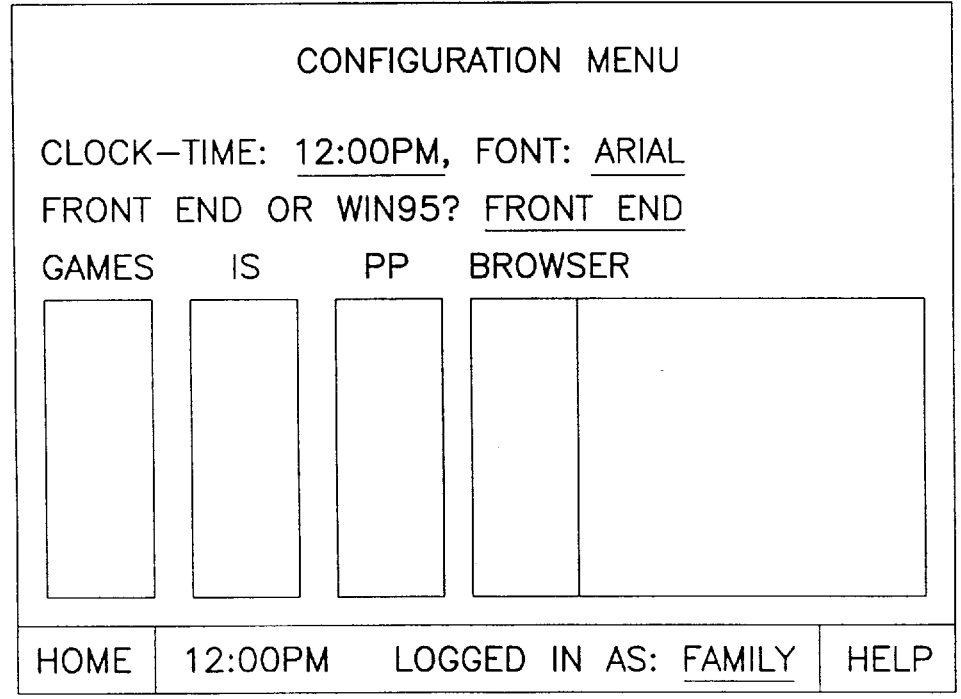

A configuration menu is shown in FIG. 14F and is found through the first screen display. Cancel is the active button in this menu due to the potential to adversely affect the look and operation of the entertainment system. A user can change the front end to essentially a computer program based interface, change the clock of the system, browse the secondary storage for other applications which can be dragged and dropped onto different menus, and remove applications from different menus.

Figure 15:
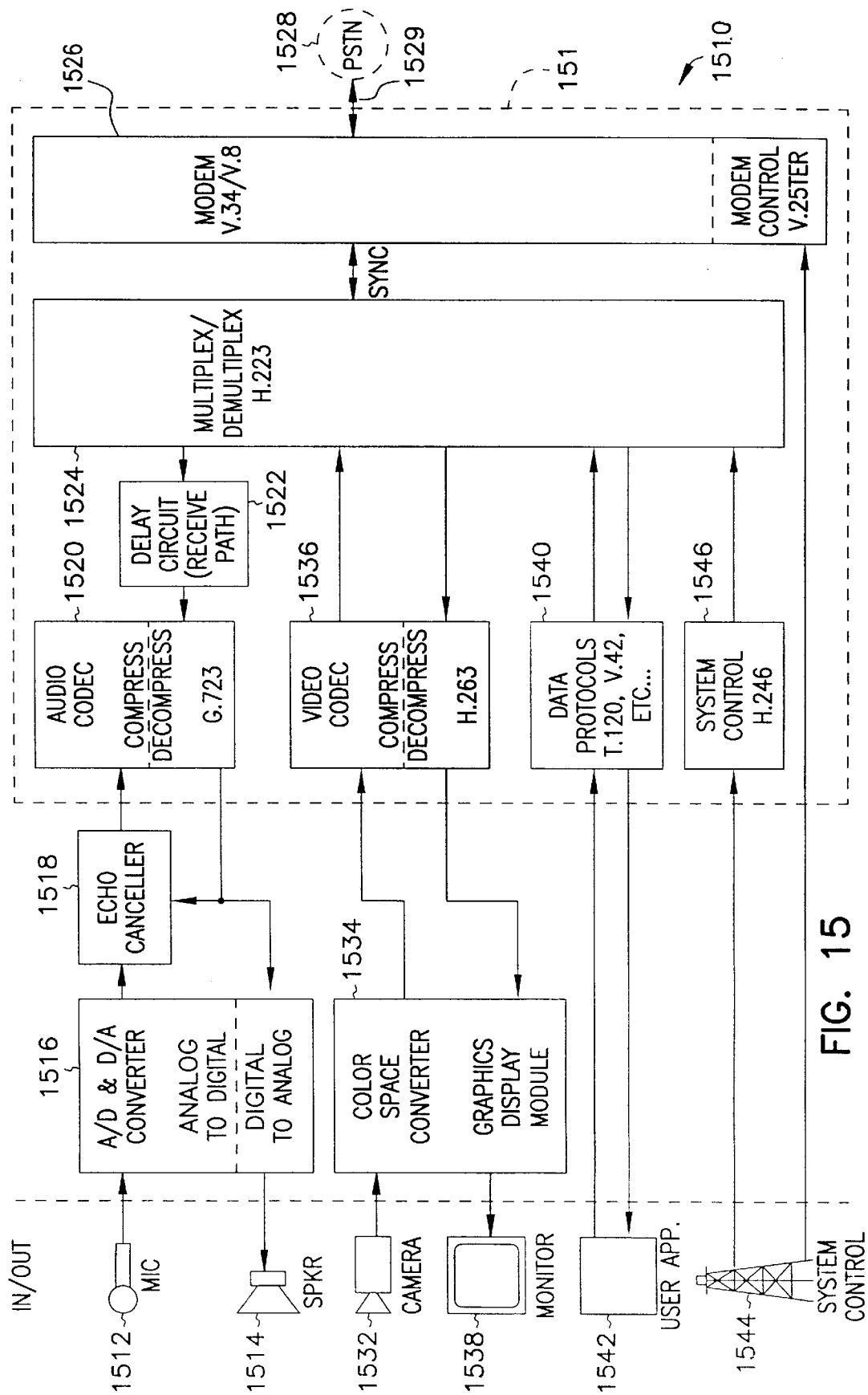
FIG. 15 is a block diagram representation of a video conferencing system based on the home entertainment system of the present invention.

A circuit card or cards for providing video conferencing via a public switched telephone network is shown generally at 1510 in FIG. 15. Each element described implements the standards that are identified in the element block. Input/output devices comprising a microphone 1512 and speaker 1514 are coupled to a signal converter 1516. Converter 1516 converts signals from the microphone to digital signals, and digital signals to analog speakers for driving the speaker 1514. Converter 1516 is coupled to an echo cancelling device 1518 for reducing feedback between the speaker and microphone. An audio coder/decoder 1520 is coupled to both the cancelling device 1518 and converter 1516, and to a delay circuit 1522, which in turn is coupled to a multiplexor/demultiplexor 1524 for processing the audio signals. Multiplexor 1524 is in turn coupled to a modem 1526, which has capability for both sending and receiving data on a public switched telephone network indicated at 1528.

A video camera 1532 is mounted external to the card, and is used to provide a video feed to a color space convertor/graphics display module 1535, which provides a further video signal to a video coder/decoder 1536, which is coupled to the multiplexor 1524. Video signals received from the camera are compressed by the coder 1536, and then transmitted over the telephone network by modem 1526. Video signals received from the network by modem 1526 are demultiplexed, decompressed and turned into VGA signals for display on a monitor. In addition to providing the ability to perform video conferencing with other compatible systems over a telephone network, several data exchanged protocols are supported at a data converter 1540, which is coupled between the multiplexor 1524 and a data storage device 1542 containing data generated by a user application. A system control icon 1544 represents the ability of the operating system of a computer, such as the computer comprising the home entertainment system to control the elements of the video conferencing circuitry. System control 1544 is coupled to a system control block 1546, which implements standated H.246 and in turn is coupled to both the multiplexor 1524 and modem 1526 to provide operator control thereof.

Figure 16:
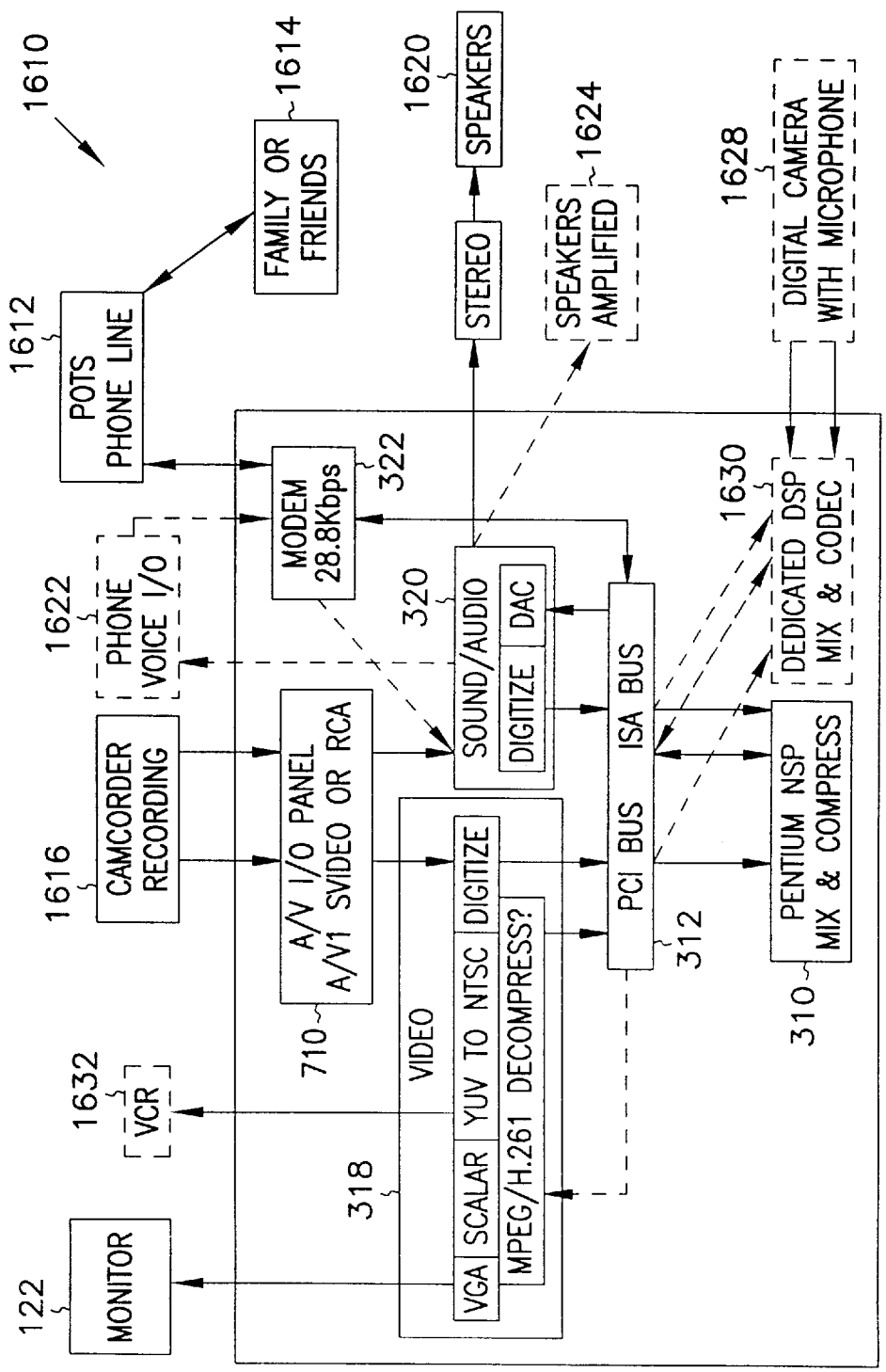
FIG. 16 is a block diagram representation of an alternative video conferencing system based on the home entertainment system of the present invention.

A further embodiment of a video conferencing aspect of the home entertainment system is shown in FIG. 16 generally at 1610. Common components of the home entertainment system are numbered the same as in previous figures. In this implementation, a plain old telephone system (POTS) connection 1612 is used for the video, sound and data signal transmission. Other users to be connected by video conference are represented at 1614. A camcorder 1616 is used to provide the audio/video feed via the back panel inputs 710, where the video and audio are then provided to the sound 320 and converter 318 cards for digitization. The digitized signals are then sent through the system bus to the modem 322 for transmission. Received signals via the modem are sent to the sound card and to the tuner for decompression and playing on monitor 122 and a stereo/speaker combination 1620. Elements indicated with broken lines, are advanced features which are easily implementable. They include a voice capability coupled to the sound card 320 and modem 322 for providing a separate voice channel when video conferencing is not desired. A set of amplified speaker is indicated at 1624 which are driven directly by the sound card 320 with need for independent amplification. A digital camera with microphone indicated at 1628 is coupled directly to a digital signal processor (DSP) with mixing and decoding functions indicated at 1630. The DSP 1630 is coupled directly to the system bus 312. Finally, a video cassette recorder 1632 is coupled to the converter card 318 for providing appropriate conversion for display on monitors 122, 122'.

Figure 21:
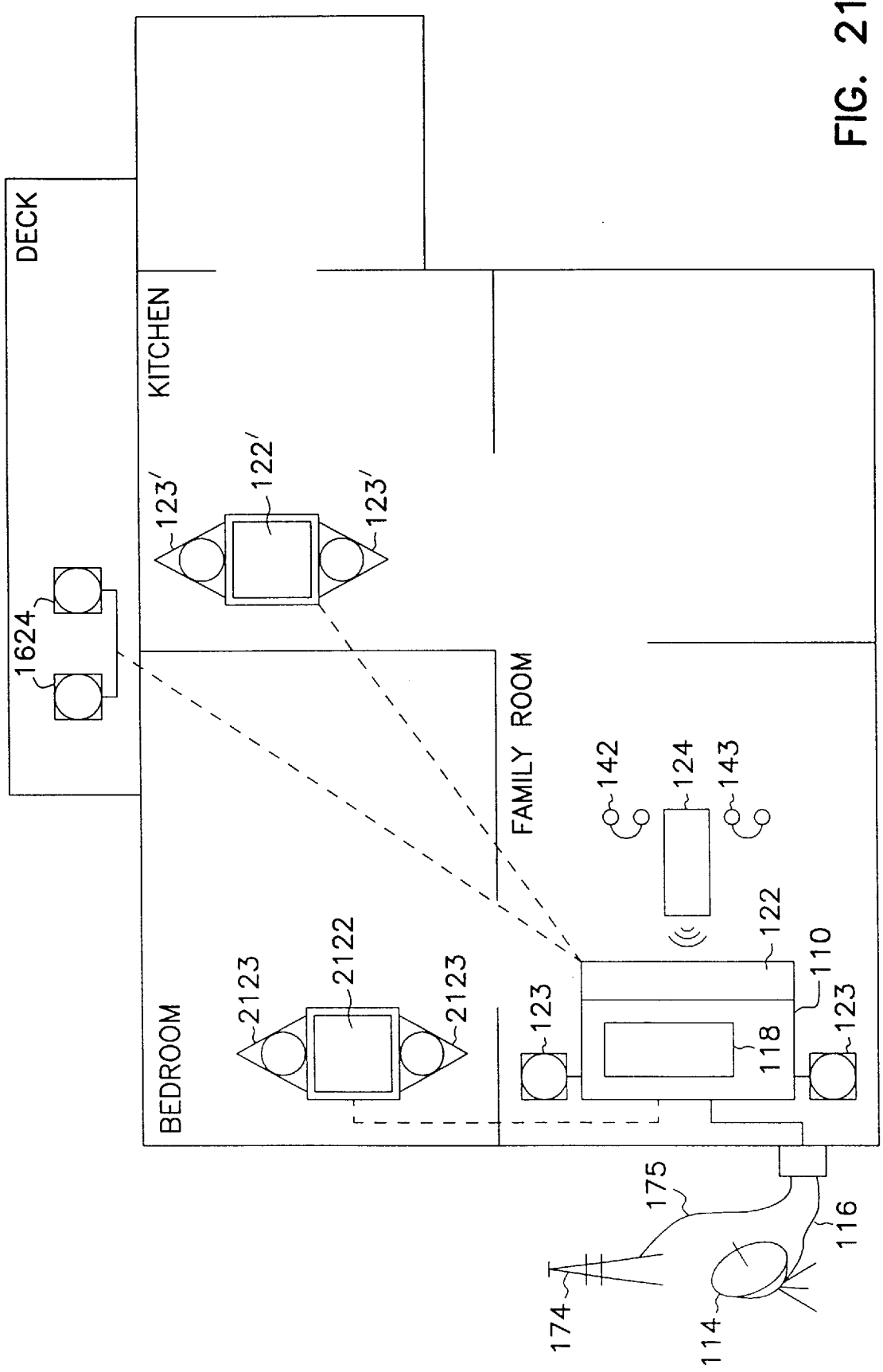
FIG. 21 is a block diagram of a household containing a home entertainment and information system according to one embodiment of the invention.

FIG. 21 shows one embodiment of the present invention integrated into a home setting. A computer and other in-home programming sources (such as a television receiver, CD player, etc.) are located in entertainment center 110 in the main living area of the house. The system also receives programming from external sources such as satellite television 114 and external networks (such as the Internet) over telephone line 174. Users in the family room can view programming on multiple windows displayed on the large-screen monitor 122. The audio portions of the video programs are independently assigned and transmitted to either speakers 123 associated with the monitor 122 or audio output devices 142, 143. User commands are input via wireless remote device 124. In addition, the entertainment system assigns and transmits programming to monitor 2122, speakers 2123, speakers 1624, monitor 122', and speakers 123', all located in other rooms of the house or outside. Each audio and video output device receives programming independently of the other devices. Any one program can be transmitted to one or more output devices at user request. For example, a user viewing a program in the family room decides to move to the kitchen. The user can command the computer to assign the program signals being output in the family room to be transmitted to the output devices in the kitchen as well or instead.

While the system has been described in terms of a personal computer, it is easily modified to encompass a settop box version, where all the circuitry is integrated into one or two cards in a box designed to sit on top of a television having VGA input. In another version, all the circuitry is included inside of the television chassis.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer controlled entertainment system for multiple users comprising:
    a computer comprising a display, memory, processing circuitry, and a data bus, wherein the display, memory, and processing circuitry are communicatively coupled to the data bus;
    a plurality of programming sources, detachably connected to the data bus, wherein each programming source comprises first and second audio data streams and a video data stream;
    a plurality of audio output devices, comprising a first audio output device and a second audio output device, communicatively coupled to the data bus such that the first audio output device receives the first audio data stream and the second audio output device receives the second audio data stream independently of each other and simultaneously with the video data stream being displayed upon the display of the computer; and
    a user input device for controlling the computer.

2. The computer controlled entertainment system of claim 1 wherein the first audio output device is a wireless headset.

3. The computer controlled entertainment system of claim 1 further wherein one of the plurality of programming sources comprises a television tuner coupled to a television signal.

4. The computer controlled entertainment system of claim 1 wherein one of the plurality of programming sources comprises a software program.

5. The computer controlled entertainment system of claim 1 further comprising a plurality of remote control devices communicatively coupled to the computer.

6. The computer controlled entertainment system of claim 5 wherein the first audio output device is uniquely assignable to the first remote control device and audio signals associated with the programming source selected by the first remote control device are communicated to the first audio output device.

7. A computer controlled entertainment system for multiple users comprising:
    a computer comprising a display, memory, processing circuitry and a data bus, wherein the display, memory, and processing circuitry are communicatively coupled to the data bus and wherein the processing circuitry comprises a plurality of audio cards and audio/video cards;
    a plurality of programming sources, detachably connected to the data bus;
    a plurality of audio output devices, comprising a first audio output device and a second audio output device, communicatively coupled to the data bus such that each audio output device receives audio information associated with a programming source independently of each other; and
    a user input device for controlling the computer.

8. The computer controlled entertainment system of claim 7 wherein the plurality of audio/video cards convert audio/video signals into digital input signals and separate the audio and video portions of the digital input signals into a plurality of data streams, comprising a first and second audio data stream and a first and second video data stream.

9. The computer controlled entertainment system of claim 8 wherein the processing circuitry assigns the audio data stream associated with the first video data stream to the first audio output device and the audio data stream associated with the second video data stream to the second audio output device.

10. The computer controlled entertainment system of claim 9 wherein the processing circuitry further comprises a transmitter for transmitting the first video data stream to the display and simultaneously transmitting the associated audio data stream to the first audio output device.

11. The computer controlled entertainment system of claim 9 wherein the processing circuitry further comprises a multiplexer for multiplexing the first video data stream with the second video data stream into a multiplexed video data stream.

12. The computer controlled entertainment system of claim 11 wherein the processing circuitry further comprises a transmitter for transmitting the multiplexed video data stream to the display and simultaneously transmitting the audio data stream associated to the first video data stream to the first audio output device and the audio data stream associated to the second video data stream to the second audio output device.

13. The computer controlled entertainment system of claim 8 wherein the computer further comprises a plurality of output channels, including a first output channel and a second output channel, communicatively coupled to the data bus.

14. The computer controlled entertainment system of claim 13 wherein the first audio output device further comprises a tuner for selectably tuning the first audio output device to receive one of the plurality of output channels.

15. The computer controlled entertainment system of claim 13 wherein the processing circuitry further comprises a router for assigning the audio data stream associated with the first video data stream to the first output channel and the audio data stream associated with the second video data stream to the second output channel.

16. The computer controlled entertainment system of claim 15 wherein the processing circuitry further comprises a transmitter for transmitting the first video data stream to the display and simultaneously transmitting the associated audio data stream to its assigned output channel.

17. The computer controlled entertainment system of claim 13 wherein the processing circuitry further comprises a multiplexer for multiplexing the first video data stream with the second video data stream into a multiplexed video data stream.

18. The computer controlled entertainment system of claim 17 wherein the processing circuitry further comprises a transmitter for transmitting the multiplexed video data stream to the display and simultaneously transmitting the audio data stream associated with the first video data stream to the first output channel and the audio data stream associated with the second video data stream to the second output channel.

19. The computer controlled entertainment system of claim 13 wherein the processing circuitry further comprises a transmitter for transmitting the first video data stream to the display and simultaneously transmitting a plurality of audio data streams associated with the first video data stream independently to the plurality of output channels.

20. A method of assigning the audio portions of a plurality of distinct programs output from a home entertainment and information system to a plurality of audio output devices, comprising the steps of:

receiving a first program signal and a second program signal;

separating the first and second program signals into a first audio data stream and second audio data stream and a first video data stream and a second video data stream;

assigning the first video data stream to a video display device and the second video data stream to the video display device;

assigning the first audio data stream to a first audio output device of the plurality of audio output devices and the second audio data stream to a second audio output device of the plurality of audio output devices; and simultaneously transmitting the first video data stream and the second video data stream to the video display device, the first audio data stream to the first audio output device, and the second audio data stream to the second audio output device.

21. The method of claim 20 further comprising:

transmitting audible output based upon the first audio data stream from the first audio output device; and transmitting audible output based upon the second audio data stream from the second audio output device.

22. A method of assigning the audio portions of a plurality of distinct programs output from a home entertainment and information system to a plurality of audio output devices, comprising the steps of:

receiving a first program signal;

separating the first program signal into a first audio data stream and second audio data stream and a first video data stream;

assigning the first video data stream to a video display device;

assigning the first audio data stream to a first audio output device of the plurality of output devices and the second audio data stream to a second audio output device of the plurality of output devices; and simultaneously transmitting the first video data stream to the video display device, the first audio data stream to the first audio output device, and the second audio data stream to the second audio output device.

23. The method of claim 22 further comprising:

transmitting audible output based upon the first audio data stream from the first audio output device; and transmitting audible output based upon the second audio data stream from the second audio output device.

24. A computer controlled entertainment system for multiple users comprising:

a data bus;

a memory communicatively coupled to the data bus;

processing circuitry communicatively coupled to the data bus;

a plurality of separate programming sources, comprising a first programming source and a second programming source, communicatively coupled to the data bus;

a display device communicatively coupled to the data bus to simultaneously present visual material associated with both the first and second programming sources;

a plurality of audio output devices, comprising a first audio output device associated with the first user and a second audio output device associated with the second user, the plurality audio output devices communicatively coupled to the data bus such that the first and second audio output devices, independently of each other, each selectively receives audio information associated with either the first or second programming sources or both; and a plurality of user input devices, comprising a first user input device associated with the first user and a second user input device associated with the second user, the plurality user input devices communicatively coupled to the data bus such that the first user input device selectively controls audio information received by the first audio output device and, independent of the first user input device, the second user input device selectively controls audio information received by the second audio output device.

25. The computer controlled system of claim 24, wherein the first user input device controls a first cursor displayed on the display device, and the second user input device controls a second cursor displayed on the display device, and if the first cursor is used to select a programming source, then the first user input device becomes a primary controller for that programming source.

26. The computer controlled system of claim 24 wherein the processing circuitry further comprises a transmitter for simultaneously transmitting an audio data stream associated with the first programming source to the first audio output device and an audio data stream associated to the second programming source to the second audio output device.

* * * * *